United States Patent
Kubota et al.

(10) Patent No.: US 6,351,698 B1
(45) Date of Patent: Feb. 26, 2002

(54) INTERACTIVE VEHICLE CONTROL SYSTEM

(75) Inventors: Tomoki Kubota; Koji Hori, both of Tokyo-to; Manabu Mazda, Chiba-ken; Kazuhide Adachi; Kouji Mukai, both of Tokyo-to, all of (JP)

(73) Assignee: Kabushikikaisha Equos Research (JP)

( * ) Notice: Subject to any disclaimer, the term of this patent is extended or adjusted under 35 U.S.C. 154(b) by 0 days.

(21) Appl. No.: 09/492,520

(22) Filed: Jan. 27, 2000

(30) Foreign Application Priority Data

Jan. 29, 1999 (JP) ............................................. 11-021481

(51) Int. Cl.$^7$ .......................... G08G 1/09; G08G 1/123; G06F 17/00
(52) U.S. Cl. .......................... 701/51; 701/209; 701/211; 340/988
(58) Field of Search ................................ 701/51, 1, 72, 701/117, 209, 211; 340/996, 438, 457, 460, 461, 490, 504, 505, 573, 988, 436, 576, 439, 815.4

(56) References Cited

U.S. PATENT DOCUMENTS

| | | | | |
|---|---|---|---|---|
| 5,177,685 A | * | 1/1993 | Davis et al. ................ | 364/443 |
| 5,699,056 A | * | 12/1997 | Yoshida ....................... | 340/905 |
| 5,864,771 A | * | 1/1999 | Yokoyama et al. ......... | 701/208 |
| 6,009,355 A | * | 12/1999 | Obradovich et al. ........... | 701/1 |
| 6,075,467 A | * | 6/2000 | Ninagawa ..................... | 340/995 |
| 6,092,005 A | * | 7/2000 | Okada ............................ | 701/1 |
| 6,101,443 A | * | 8/2000 | Kato et al. .................. | 701/210 |
| 6,115,668 A | * | 9/2000 | Kaneko et al. .............. | 701/207 |
| 6,144,318 A | * | 11/2000 | Hayashi et al. ............. | 340/995 |
| 6,154,123 A | * | 11/2000 | Kleinberg .................... | 340/436 |

FOREIGN PATENT DOCUMENTS

| | | |
|---|---|---|
| JP | 9-14957 | 1/1997 |
| JP | 9-159473 | 6/1997 |

* cited by examiner

Primary Examiner—Tan Nguyen
Assistant Examiner—Dalena Tran
(74) Attorney, Agent, or Firm—Lorusso & Loud

(57) ABSTRACT

An interactive navigation system includes a navigation processing unit, a current position sensor, a speaker, a microphone and a display. When it is preliminary inferred, based on receipt of a detection signal from the sensor, that a vehicle has probably been diverted from a drive route determined by the navigation processing unit, a machine voice question is produced through the speaker for confirmation of the inferred probability of diversion. A driver or user in the vehicle answers the question, which is input through the microphone and analyzed to be affirmative or negative, from which a final decision is made as to the vehicle diversion. In a preferred embodiment the question is spoken by a personified agent who appears on the display. The agent's activities are controlled by an agent processing unit. Communication between the agent and the user improves reliability and accuracy of inference of any vehicle condition which could not be determined perfectly by a sensor only.

14 Claims, 12 Drawing Sheets

INTERACTIVE VEHICLE CONTROL SYSTEM

TECHNICAL FIELD

The present invention relates to an interactive vehicle control system that may determine and detect, without failure, various vehicle conditions including current vehicle speed, shift position, steering angle, fuel remainder, coolant temperature and other conditions of devices and instruments equipped in a vehicle, and environmental conditions such as current road conditions encountered in driving, ambient air temperature, distance to neighboring vehicles in front or rear, etc. The present invention may be incorporated into an agent system in which such vehicle conditions are determined in cooperation with a personified agent or imaginary living body depicted on a display in the vehicle, whose activity is controlled to achieve good communication with a driver or passenger in the vehicle.

BACKGROUND OF THE ART

Some attempts have been made to determine vehicle conditions in response to detection signals from sensors mounted in or to the vehicle. One example is described in Japanese patent publication No.9-159473 which relates to a navigation system in which vehicle orientation and road inclination data are compared with each other to automatically identify the road currently driven. Japanese patent publication No.9-14957 discloses a system with a sensor which detects the road condition, more specifically detects if the road is in a wet, snow covered or icy condition.

Determination of the vehicle conditions is a matter of great importance to accurate navigation to a designated goal, suitable control of vehicle devices and instruments and safe driving.

The prior art systems depend on detection by sensors. However, with respect to some vehicle conditions, the sensors merely indicate probability but can not give definite and reliable indications. For example, even if a thermometer detects a road surface temperature below the freezing point, it is not always true that the road is ice bound. A combination of plural sensor detection could somewhat improve reliability but would greatly increase the manufacturing costs and complexity of the overall system.

SUMMARY OF THE INVENTION

Accordingly, it is a primary object of the present invention to provide a novel system with simple construction, capable of determining the vehicle conditions with much improved reliability and accuracy.

Another object of the present invention is to provide a system for achieving vehicle control in response to results of the reliable and accurate determination of the vehicle conditions.

The inventors have already filed a U.S. patent application Ser. No. 09/119,238 on Jul. 21, 1998 which relates to an agent system used in a vehicle, typically in combination with a navigation system. In this agent system, a personified agent appears on a display in the vehicle in response to detection of a specific vehicle condition. The personified agent receives information from and transmits information to a driver or passenger, the result of which communication is used to automatically control the vehicle in conformity with the current vehicle conditions. In such an agent system, it is also necessary to recognize the vehicle conditions with improved reliability and accuracy for better communication between the agent and the driver. Accordingly, it is still another object of the present invention to provide an improved agent system capable of achieving better communication between the agent and the driver for better vehicle control in conformity with the conditions in and around the vehicle.

To achieve the above objects, in accordance with a first aspect of the present invention, there is provided an interactive vehicle control system comprising a sensor mounted on a vehicle to detect whether or not a specific physical quantity that rotates to the vehicle or driving of the vehicle. The sensor outputs a detection signal received by a discriminating means which determines a degree of reliability of existence of at least one specific condition to be considered in vehicle control. Output means outputs a question for confirmation of the specific condition when the degree of reliability determined by the discriminating means lies within a predetermined range. Input means inputs a user's answer to the outputted question and final decision making means receives the users answer to determine whether or not the vehicle control is to be executed. Execution means executes vehicle control in accordance with the result of determination by the final decision making means.

In this system, the specific condition may comprise one or more selected from the group consisting of current vehicle position, current vehicle speed, current shift position of an automatic transmission, current operative condition of any device mounted on the vehicle, engine oil temperature and pressure, passenger compartment temperature, outside temperature, road conditions and weather conditions.

The output means typically comprises a speaker through which the question is outputted as a machine voice. The input means typically comprises a microphone through which the users answer is inputted as the users own voice. The final decision making means may include a voice analyzer that analyzes the users voice answer to determine if the answer is affirmative or negative.

In a preferred embodiment this system further comprises a display on which a personified agent appears for communication with the user in the vehicle, and agent control means for controlling activities of the agent. The question from the output means is a type of the agents activities and is controlled by the agent control means.

In accordance with another aspect of the invention, there is provided an interactive automatic transmission control system comprising sensor means mounted on a vehicle to infer that the vehicle is now running on an uphill or a downhill of inclination greater than a predetermined angle; output means that outputs a question for confirmation of the inference by the sensor means; input means that inputs a users answer to the output question; and an automatic transmission control means that outputs a shift-down command to the automatic transmission when it is confirmed by the users answer that the vehicle is actually running uphill or downhill.

In a preferred embodiment of the invention, the sensor means comprises a slope sensor for detecting orientation of the vehicle in the direction of advancement thereof. The sensor means may comprise a combination of an accelerator sensor for detecting a degree of opening of an accelerator and a vehicle speed sensor for detecting a current vehicle speed, result of detection of these sensors being indicative of a vehicle speed variation with respect to the degree of accelerator opening at a current shift position.

In accordance with still another aspect of the invention, there is provided an interactive vehicle automatic transmission control system comprising sensor means mounted on a vehicle to infer that a vehicle is now running on a slippery road; output means that outputs a question for confirmation of the inference by the sensor means; input means that inputs a users answer to the output question; and an automatic transmission control means that outputs a shift-down command to an automatic transmission when it is confirmed by the users answer that the vehicle is actually running on a slippery road.

In a particular embodiment of this system, the sensor means comprises a wheel speed sensor for detecting respective speeds of driven wheels and non-driven wheels, capable of indicating wheel slippage between the driven and non-driven wheels, and/or a thermosensor for detecting ambient temperature.

In accordance with still another aspect of the invention, there is provided an interactive navigation system comprising a current position sensor for detecting current position of a vehicle; route-finding means for determining a drive route from the current position detected by the current position sensor to a predetermined goal location; inference means that receives, during driving, a detection signal from the current position sensor to infer a probability that the vehicle has diverted from the drive route determined by the mute-finding means; a speaker that outputs a machine voice question by which the inferred probability of diversion can be confirmed; a microphone that inputs a users voice answer to the question; final decision making means that receives the user's voice answer to determine whether or not the current vehicle position is actually offset from the drive route; and position correct means that corrects the vehicle position on a map in accordance with the result of determination by the final decision making means.

In a particular application of this system, route-finding means determines another drive route from the corrected vehicle position, determined by the position correct means, to the goal location when the final decision making means confirms diversion of the vehicle from the previous drive route.

In accordance with still another aspect of the invention, there is provided an interactive navigation system comprising a current position sensor for detecting current position of a vehicle; route-finding means for determining a drive mute from the current position detected by the current position sensor to a predetermined goal location; inference means that infers a probability of a traffic jam on the current drive route which has been determined by the route-finding means and along which the vehicle is currently driven; a speaker that outputs a machine voice question by which the inferred traffic jam probability can be confirmed; a microphone that inputs a users voice answer to the question; and final decision making means that receives the users voice answer to determine whether or not there is actually a traffic jam on the currently driven route. The route-finding means determines another drive route to the goal location which detours the point of the traffic jam, when the final decision making means confirms the traffic jam on the currently driven route.

BRIEF DESCRIPTION OF DRAWINGS

The above and other objects of the present invention will become apparent from the following description when read in conjunction with the accompanying drawings in which.

DESCRIPTION OF PREFERRED EMBODIMENTS OF THE INVENTION

Figure 1:
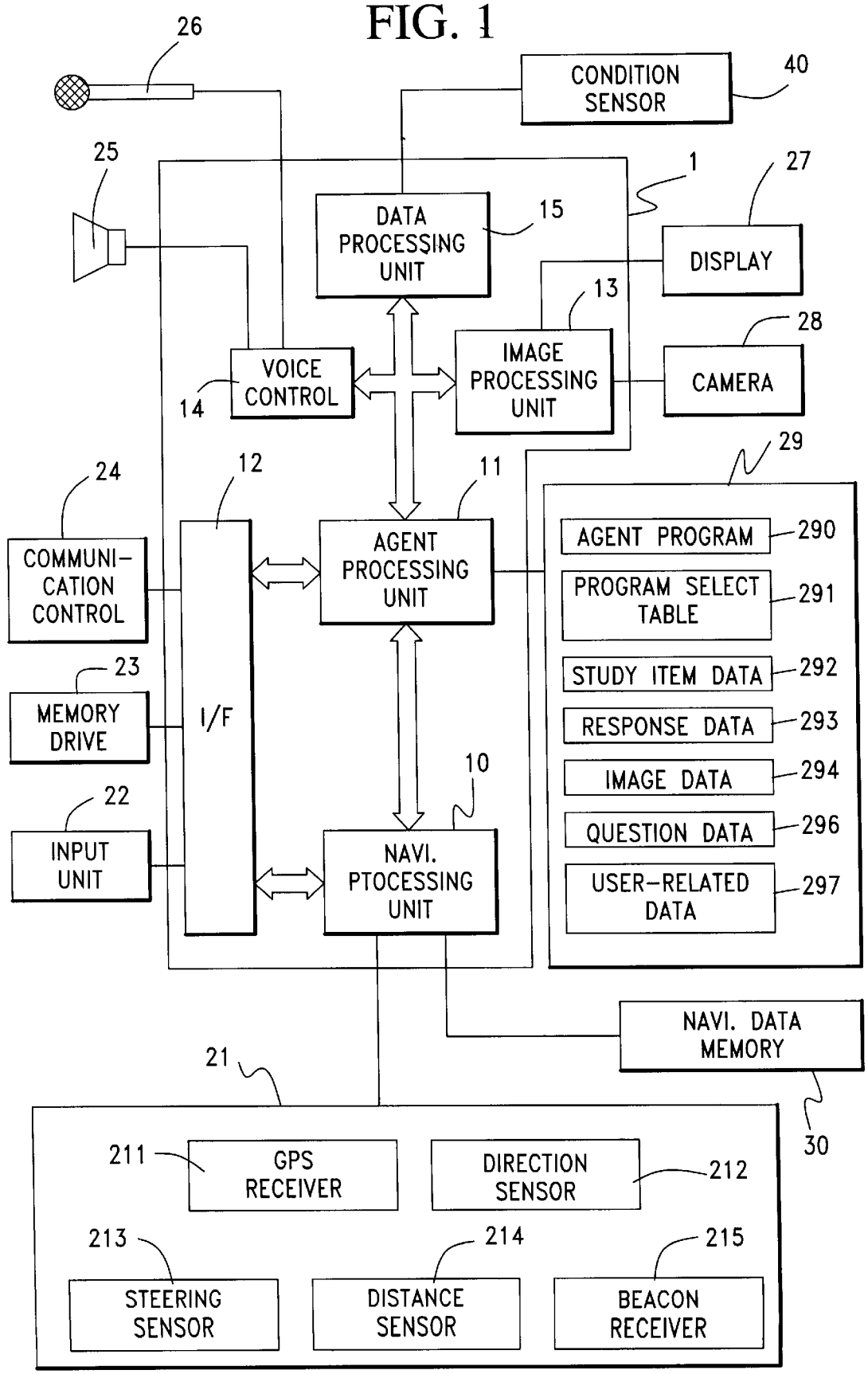
FIG. 1 is a block diagram showing an agent system in accordance with an embodiment of the present invention.

In a preferred embodiment, which will be hereinbelow described in reference to FIGS. 1–14 of the accompanying drawings, the present invention is designed as and cooperates with an agent system in which a personified agent appears on a graphic display in a vehicle. The system first receives a detection signal from a sensor to infer some vehicle condition. The agent puts an appropriate question to a driver and receives an answer from the driver, which proves that the result of previous inference is true or not. Thus, the agent's activity cooperates with and assists the sensor detection to provide a determination of the vehicle condition with improved reliability and accuracy.

More particularly, a first determination is made based on a detection signal from a sensor mounted in or on the vehicle to infer likelihood of a specific vehicle condition. When occurrence or existence of some vehicle condition is inferred by the first determination, then an agent produces a question for confirmation of the inferred vehicle condition. This is made typically by voice output from the agent. For example, when a detection signal from a sensor infers a probability that the vehicle could stray from the scheduled drive route onto a byroad, the agent questions "Will you change the drive route?" to the driver. When a probability of a traffic jam on the drive route is inferred by sensor detection, the agent says "Are you in a traffic jam?". An input device receives the drivers response or answer to the agent's question, by which the system finally determines if the initially inferred vehicle condition is confirmed or denied. In response to the result of the final determination, the system may manage the vehicle control. For example, when diversion from the scheduled drive route is affirmed by the final determination, the system proceeds to searching for a new route. When it is finally determined that the vehicle is now on a snowy road, then the system changes an automatic transmission shift-change control map to one with higher up-shift points, which will assist smooth and safe driving on a snowy road. When there is a final determination of a traffic jam on the drive route, the system may prohibit an up-shift.

The term "vehicle condition" used throughout the specification and claims should be understood to mean any condition or item of information related to the vehicle, including conditions of the vehicle itself, conditions inside and outside of the vehicle, road conditions, conditions currently confronting the vehicle, etc. The conditions of the vehicle itself include a current vehicle position and a current vehicle speed, both of which can be directly detected by sensor means. The conditions inside of the vehicle include current condition of devices and instruments equipped in or on the vehicle such as engine, automatic transmission, navigation system, audio units, air-conditioner, wiper, windows, etc. Accordingly, a current shift position, operative condition of blinker and wiper, coolant temperature, engine oil temperature, engine oil pressure, passenger compartment temperature, ignition switch operation, brake pedal stroke, accelerator pedal stroke, side brake operation, horn operation, belt loosening, remaining fuel, light or lamp operation, seat belt operation, door opening, window opening, ABS operation, air-conditioner operation, and tire air pressure are all in-vehicle conditions. The in-vehicle conditions may also include the driver's or users feeling, state of mind, intention and desire. The user may feel hot or cold, feel tired, want to rest, intend to open the window, etc., all being in-vehicle conditions. The conditions outside of the vehicle typically include weather conditions such as fine, cloudy, rain, snow, windy, foggy, etc. Ambient open air temperature, distances to preceding and following vehicles, etc. are also examples of the outside of vehicle conditions. The road conditions include every condition related to the road on which the vehicle is now running or is expected to be running. For example, the vehicle may be running uphill or downhill, on an expressway, underpass, exit from or entry to an expressway, mountain winding road, bad-conditioned road, snowy or icy road, wet road, crowded road, etc. or resting at an underground parking facility, service area of an expressway, etc., all being included in what is meant by the road conditions. The currently confronted conditions include such conditions as running uphill, downhill, on a snowy road, diversion from the prescribed drive route, a traffic jam, elimination of a traffic jam, etc.

The personified agent in this embodiment may be represented as a planar image or three-dimensional image by holography, for example. The activity, including an utterance of the agent, is controlled in response to determination of the vehicle conditions and results of past record study. The vehicle conditions may include various conditions of the vehicle itself, the driver, the passenger(s) and preceding, following and oncoming vehicles. The past record study means a study of past record or history of the vehicle conditions and may further include the driver's previous reactions to the agent's activity appearing on the display. Thus, the driver may communicate with the agent in the vehicle, even while driving.

The "agent" used herein is defined as an imaginary personified subject like a human body. The agent may be modeled after a specific living or historical person, animal (such as chick, dog, cat, frog and rat), animated character, etc., having a particular identity, personality and individuality. The agent may be a child at the beginning and grown with time. The agent is a caricature of a living body in an electronic device (or navigation system) and takes action and makes judgement like a human. Accordingly, the same agent may communicate differently with the driver in a different situation. For example, even with the same vehicle conditions, the agent's activity would vary depending on the result of past record study. If the agent is a caricature of a human body, the agent could output a misjudgement or stupid inquiry, which may be corrected by the drivers response. This is of course based on the past record study.

FIG. 1 is a block diagram of the agent system embodying the present invention. There is a processing unit 1 including a navigation processing unit 10 for determining a drive route to a predetermined goal that is known to the driver by visual and/or voice message, an agent processing unit 11 for controlling the activity of the agent, an interface (I/F) 12, an image processing unit 13, a voice control unit 14 and a current status data processing unit 15.

Agent processing unit 11 determines the activity of the agent, i.e., a particular figure appearing on a display 27 within a vehicle, in accordance with the current status of the vehicle and the result of past record study. In this agent system, as described before, agent processing unit 11 first infers a probability of a specific condition in or around the vehicle, which is confirmed by the agent's inquiry and the drivers reply to finally determine if the vehicle now actually encounters said specific condition. Unit 11 executes an appropriate control routine in accordance with the result of final determination.

Navigation processing unit 10 and agent processing unit 11 each have a central processing unit (CPU) that operates in response to the input information to perform various data processing operations and control. To CPU are connected ROM, RAM and a timer through data bus lines. Units 10 and 11 are connected with each other by a network so that data processed in one unit may be given to the other unit. Thus, agent processing unit 11 may receive the current vehicle position data which has been determined by navigation processing unit 10 in response to a detection signal from a current vehicle position sensor 21. Likewise, data regarding the drive route to the goal which has been determined by navigation processing unit 10 is transmitted to the agent processing unit 11. A ROM is a read-only-memory storing various data and programs necessary to the control operation in the CPU. RAM is a random-access-memory to be used as a working memory when the CPU performs data processing.

CPU of navigation processing unit 10 and agent processing unit 11 reads out the programs from the ROM to conduct necessary operations. In a modified embodiment, the CPU reads out the programs from a memory medium in a memory unit 23, in which case the programs are then installed into an agent data memory 29, a navigation data memory 30, a hard disk (not shown) or any other memory unit. A necessary program is loaded from the memory to RAM for execution. It may be possible that CPU reads out the necessary program from memory drive 23 to load it directly to RAM.

To navigation processing unit 10 are connected current vehicle position sensor 21 and navigation data memory 30. To agent processing unit 11 is connected agent data memory 29. Connected to I/F 12 are an input unit 22, memory unit 23, a communication control unit 24 and other control units (for up-and-down of windows, flow rate of an air conditioner, volume of audio instruments, on-and-off of head lamps, on-and-off and intermittence of windshield wipers, etc. A display 27 and a camera 28 are connected to image processing unit 13. Voice control unit 14 includes a voice synthesizer 141 to which a voice output unit or speaker 25 is connected, and a voice analyzer 142 to which a microphone 26 is connected. A current status sensor 40 is connected to current status data processing section 15.

Current position sensor 21 for detecting the current absolute position (its latitude and longitude) of the vehicle has a GPS (global positioning system) receiver 211, a direction sensor or compass 212, a steering angle sensor 213, a distance sensor 214 and a beacon receiver 215 that receives the position signal from beacons arranged on the road. GPS receiver 211 receives radio waves from earth satellites to determine the vehicle position. Beacon receiver 215 receives positional information from beacons on the roads. GPS receiver 211 and beacon receiver 215 can solely act to locate the vehicle position. Where neither the GPS receiver 211 nor the beacon receiver 215 can receive sufficient information to specify the current vehicle position, direction sensor 212 and distance sensor 214 cooperate with each other to infer the current position. To make a more precise measurement, a differential GPS receiver may be used in addition.

Direction sensor 212 includes a terrestrial magnetism sensor that detects terrestrial magnetism to determine orientation of the vehicle, a gyromagnetic sensor that detects a rotational angle velocity of the vehicle that is integrated to determine orientation of the vehicle, a pair of wheel sensors that detect an output pulse difference (a difference of movement between left and right wheels) to detect an angle of gyration of the vehicle. Steering angle sensor 213 employs an optical sensor or rotation resistance sensor mounted at a rotating member of the steering assembly to detect steering angle. Distance sensor 214 detects a distance of movement by detecting revolution of the wheels or acceleration, for example.

Input unit 22 is used to enter data regarding the current vehicle position and the goal (destination) when initiating navigation processing. Input unit 22 is also used to input various items of data including name of the agent, and user-related data (age, sex, hobby, character, etc.) which should be used in the agent control operation. A part of the user-related data may be obtained by the users reply to the agent's message or question. In this case, the users reply may be input as an utterance through microphone 26 or by operation of input unit 22. Thus, not only input unit 22 but also microphone 26 will act as data input means.

A typical example of input unit 22 is a touch panel arranged on display 27, which is adapted to input necessary data by finger touch of a key or menu represented on display 27. Another example of Input unit 22 is a keyboard, mouse, bar code reader, write pen, joy stick, infrared remote controllable input unit and a voice analyzer. An infrared remote controller may cooperate with a receiver that receives infrared signals from the input unit. The remote controller has a joy stick for moving a cursor on display 27, menu designating keys or buttons and ten keys.

Memory drive unit 23 drives a memory medium storing the computer program that is required to perform the operations of navigation processing unit 10 and agent processing unit 11. The computer program stored in the memory medium includes various programs and data. The memory medium may be any one capable of storing the computer program. A magnetic memory medium such as a floppy disk, hard disk and magnetic tape, semi-conductor memory medium such as a memory tip and IC card, magneto-optical memory medium such as CD-ROM, MO disc, PD, DVD, etc., are examples of suitable memory media. Any printed matter describing the computer program may also used in cooperation with a character analyzer.

When a rewritable memory medium such as a floppy disk or IC card is used, it may also be used to store data in RAM of navigation processing unit 10 and agent processing unit 11 or memory 29, 30. For example, study data (study item data and response data) regarding activities of the agent and the user-related data may be stored in an IC card. The driver may use the IC card storing the drivers own data in common for two or more vehicles, if these vehicles have the same agent control system. This means that the agent is peculiar not to the vehicle but to the driver.

Communication control unit 24 transmits and receives data to and from a portable telephone to allow the driver to communicate with others outside the vehicle. Communication control unit 24 may receive data regarding road information including traffic jams and traffic accident information that are supplied from a traffic information center such as ATIS (advanced traffic information center). Where the agent system cooperates with a VICS (vehicle information and communication system), communication control unit 24 includes a beacon receiver which receives the traffic jam information from beacons arranged on the road around the vehicle current position. It also receives Karaoke data. The study data regarding the agents past activities may also be received and transmitted through communication control unit 24.

Voice output unit 25 comprises a plurality of speakers arranged in the vehicle through which a voice synthesized by synthesizer 141 of voice control unit 14 is outputted. The outputted voice includes a voice message for guidance along the drive route and the agent's voice or sound that is a type of agent activity. The speakers for audio instruments may be used as voice output device 25. Voice control unit 14 changes accent and tone quality of the voice output by voice output unit 25 in response to the driver's tuning command. Voice output unit 25 also outputs a synthesized voice by which the contents of the drivers speech recognized by voice analyzer 142 are called back to the driver for confirmation purposes.

A microphone 26 functions as voice input unit for inputting the user's voice which is then processed by voice control unit 14. For example, a voice designating the destination of the drive route in navigation processing is input through microphone 26. The drivers answer in response to the agent's activity or question is also input through microphone 26. A microphone for Karaoke may be used as microphone 26. However, microphone 26 should preferably have sufficient directionality to collect the drivers voice. A hand-free unit comprising speaker 25 and microphone 26 may be used for telecommunication without a portable telephone.

Display 27 is used to present images, including a drive route determined by navigation processing unit 10 in response to the users input of the desired destination through input unit 22, and a guide map along the drive mute. Display 27 also presents the agent with its activity and appearance controlled by agent processing unit 11. Any image taken by camera 28 is also shown on display 27 after being processed by image processing unit 13. Display 27 may be a CRT display, a liquid crystal display, a plasma display or a hologram device that projects a hologram onto a front glass. Display 27 may include a touch panel having the function of input unit 22.

Camera 28 comprises CCD cameras that take photographs inside and outside of the vehicle. An inside CCD camera mounted in the vehicle takes photographs of the driver. CCD cameras are also mounted at the front rear, right side and left side for taking photographs of surroundings of the vehicle. The photographs taken by camera 28 are supplied to image processing unit 13 for image analysis. The result of the image analyzing operation by image processing unit 13 is used to determine a program number by agent processing unit 11. In this embodiment, camera 28 also acts as a vehicle condition sensor and photographs taken by camera 28 may be used to infer probability of a specific vehicle condition.

Agent data memory 29 stores data and programs necessary for agent processing operation in accordance with this embodiment of the present invention. Memory 29 comprises a memory medium which may be in the form of a floppy disk, hard disk, CD-ROM, MO disk, MO card, magnetic tape, IC card, DVD disc, etc. and a drive unit for the memory medium used. In a preferred embodiment, study item data 292, response data 293 and user-related data 297 are stored in a portable memory medium such as an IC card or floppy disk, and other data is stored in a hard drive.

Agent data memory 29 stores agent program 290, program select table 291, study item data 292, response data 293, image data 294, question data 296, user-related data 297 and other data necessary for agent control operation. Study item data 292 and response data 293 represents the result of study of the agent through the drivers operation and/or response. Accordingly, study item data 292 and response data 293 are peculiar to each driver and may be renewed when the driver makes some operation and/or response.

Image data 294 relates to stationary or moving pictures identifying appearance and activities of the agent to be shown on display 27. As described before, the agent represented on display 27 may be like a human body, like an animal such as a chick, dog, cat, frog, rat, etc., robot or any imaginary character. The agent may be a child at the beginning, which grows with time as a result of study. Image data 294 involves a plurality of agents and their appearance, one of which may be selected by the user through input unit 22. The user can freely name the selected agent by input operation.

Question data 296 involves a collection of words which may be selected by agent processing unit 11 and synthesized by synthesizer 141 to be outputted through speaker 25 as a question of the agent to the user, when unit 11 infers a specific drive condition based on detection by sensor 21, 40. Unit 11 awaits the users answer inputted by microphone 26 or input unit 22 and makes a final decision as to the inferred drive condition in or around the vehicle. Preferably, every question by the agent can be answered by simple affirmative or negative words, typically "yes" or "no" For example, when it is first inferred that the vehicle is running on a snowy road, the agent asks a question "snowy road?", which can be easily answered by the user saying "yes" or "no".

User-related data 297 may include data regarding the users name, address, birthday, sex, character, hobby, favorite sport, favorite baseball team, basketball team, football team, soccer team, ice-hockey team, etc., favorite foods, religion, height and weight, drivers seat position and back-support angle, room-mirror angle, eye position in driving, digitalized face photograph, striking feature of voice, and other data which can identify the user Every user has different user-related data 297. User-related data 297 is typically used to analyze the users communication with the agent. Some of user-related data 297 is used to distinguish one user from another.

Agent program 290 stores agent processing programs and communication programs in numerical order. Agent processing programs command activities of the agent. Communication programs command communication between the agent and the driver which is outputted through display 27 and speaker 25. Agent program 290 stores plural kinds of voice patterns, for example, man's voice, woman's voice, child's voice, mechanical sound, animal voice, famous actors or actress's voice, and popular characters voice. The driver can select a favorite one of the voice patterns stored in agent program 290 through input device 22.

Program select table 291 is for use in selection of a specific communication program stored in agent program 290. Program select table 291 describes various items by which a specific one of the communication programs is selected. Such items may be determined from the current status of the vehicle or driver detected by sensors 40, 21 and camera 28, including time and place where an engine ignition switch is turned on, coolant temperature, shift position, accelerator opening degree, etc. Such items may also be determined from the result of past record study stored as study item data 292 and response data 293, including the number of today's ignition-on operations, time passage from last ignition-off operation, total number of ignition-on operations, etc.

Study item data 292 and response data 293 includes data indicating the result of past record study by the agent about the drivers driving operations and response to the agent's inquiries. Accordingly, data 292 and 293 are renewed every time when the agent makes any study. These data are peculiar to each driver.

The study item data 292 includes data indicating the total number of ignition-on operations, date and time of the last ignition-off operations, number of todays ignition-on operations, fuel remainder records, skip records, default values, etc.

The total number of ignition-on operations is increased by one each time the ignition switch is turned on to ignite the engine. Each time the ignition switch is turned off, its date and time is renewed and stored as the last ignition-off data. Each time the ignition-on operation occurs, its number (in a day) and its ignition-off time are recorded as today's ignition-on data. The fuel remainder record stores fuel remainders at the last five fill-ups. Each time the fuel is refilled, the newest data is stored and the oldest data is deleted. The count of the skip record data is increased each time the driver refuses or neglects the agent's recommendation or communication even when such program number has been selected under control of the present invention. The default value includes initial values such as time, number, temperature, vehicle speed, data, etc. The default value is used to initialize data when data has been changed by the driver, for example, when the driver has changed the ignition-on operation time from 24:00 to his or her desired time.

Other data may be included in the study item data 292, for example, birthdays of the driver and his or her relatives and friends (that can be input by the driver), national holidays and their histories, date of events such as Christmas Eve, St. Valentine Day, etc. Among the communication programs, there may be a special menu for a special day. In an example of a special menu communication program, the agent might appear on display 27 while dressed as Santa Claus on Christmas Eve and Day.

The response data 293 includes the users response history to the agent's activities in the order of the communication program number. The response data has different contents for different communication programs. The response data may store several latest entry data items (time and content). The response data contents may be classified into three patterns, "Neglected", "Refused" and "Accepted" or it may have a more detailed classification, for example, "Resolutely Refused", "Angrily Refused", "Pleased", etc.

Agent processing unit 11 reads out study item data 292 and response data 293 and receives the current status detection signals from sensor 40, for example, to select and execute a specific program with reference to program select table 291, according to which the agents activity appears on display 27 for communication with the driver. In an example, when the coolant temperature is lower than a predetermined level, the agent looks sleepy. For example, the agent appears with closed eyes, gives a yawn, stretches, rubs his or her eyes, makes a slow motion. The agent's sleepy action may be changed regularly or randomly. For example, the agent usually appears with closed eyes but sometime rubs eyes and gives a yawn.

In another example of the agent activity, the agent falls and lands on his or her rear, overruns his or her mark and totters or yows, in response to detection that the driver slammed on the brakes. The agent's action may be changed with the result of past record study. For example, the agent falls down backwardly on first three panic braking operations, overruns his or her mark and totters on four to ten such operations, and stands firm after that. This means that the agent becomes accustomed to the drivers panic braking operation step by step. The agent's action to be selected may be lowered by one step when a predetermined time interval, for example one week, has passed since the last panic braking.

Figure 2:
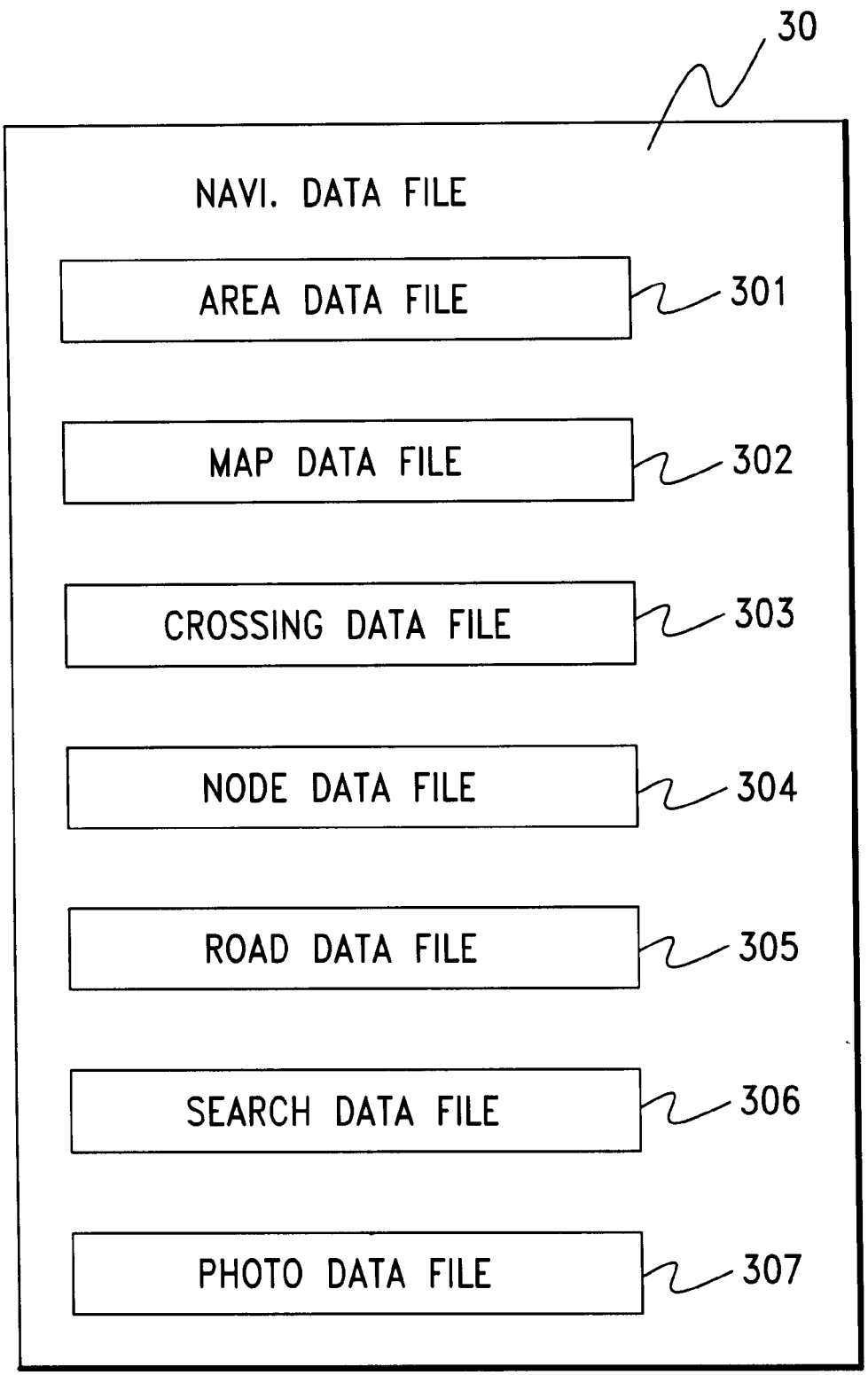
FIG. 2 shows various data files stored in a navigation data memory.

FIG. 2 represents data files stored in navigation data memory 30 (FIG. 1). As shown in FIG. 2, navigation data memory 30 stores communication area data file 301, map data file 302, crossing data file 303, node data file 304, mad data file 305, route-finding data file 306 and photo data file 307. Navigation data memory 30 comprises one or a combination of storage media including a floppy disk, hard drive, CD-ROM, magneto-optical disk, magnetic tape, IC card, magneto-optical card, etc., and drive units therefor. For example, route-finding data file 306 is made of a rewritable memory such as flash memory, while other data files are stored in CD-ROM, and separate drive units therefor are respectively used.

Communication area data file 301 stores communication area data per handy phone types. Communication data is used for representation, on display 27, of communicatable area by the driver's handy phone connected or non-connected to communication control unit 24. This data is also used while determining the drive route to the destination. The respective communication area data is assigned its peculiar number for easy access thereto. The communicative area is defined by a continuity of short segments, so that the communicative area data may be specified by a plurality of coordinate data representing points connecting the segments. In another example, the communicative area is divided into plural rectangles, each rectangle being defined by two diagonal points thereof, in which case the communicative area data comprises a plurality of items of coordinate data representing diagonal points of the respective rectangles in the communicative area.

Data in communication area data file 301 is preferably renewable to conform with change of the communicative area of the handy phone. To meet this requirement, the handy phone is connected to communication control unit 24 for communication with an information center for updating of the contents of communication area data file 301. In another example, communication area data file 301 is in a rewritable and updatable memory such as a floppy disk or IC card.

Map data file 302 stores map data to be represented on display 27. Map data is stored in a tree construction. The uppermost layer stores map data of the broadest territory, and lower layers store more detailed map data of smaller territories. The map data of the respective layers are assigned their peculiar map codes.

Crossing data file 303 stores crossing data such as crossing numbers specifying the crossings one by one, crossing names, crossing coordinates, road numbers specifying roads starting and terminating with the crossings, existence of signals at the crossings, etc.

Node data file 304 stores node data specifying coordinates of respective points on the respective roads. Any road section may be defined by a plurality of node data thereon between the beginning and end of the section.

Road data file 305 stores road numbers specifying the roads one by one, the crossing numbers at the beginning and end of the respective roads, other road numbers of the road that begins or terminates with the same point, road width, prohibition information (no parking, no entrance, one-way road, etc.), number of photo data, etc.

Data stored in crossing data file 303, node data file 304 and road data file 305 are particularly useful for route-finding.

Route-finding data file 306 stores a series of crossing data and a series of node data which constitute the routes found in the navigation system. A series of crossing data includes data regarding names and numbers of the crossings on the suggested drive route, numbers of the photos showing these crossings, corners and turns in the drive route, distances between the crossings, etc. A series of node data includes data regarding coordinates of the respective nodes on the drive route.

Photo data file 307 stores photos showing the crossings, conspicuous landscape and buildings, for example, along the suggested drive route. Photos are assigned their individual photo numbers and stored in the form of digital, analog or negative photos.

Figure 3:
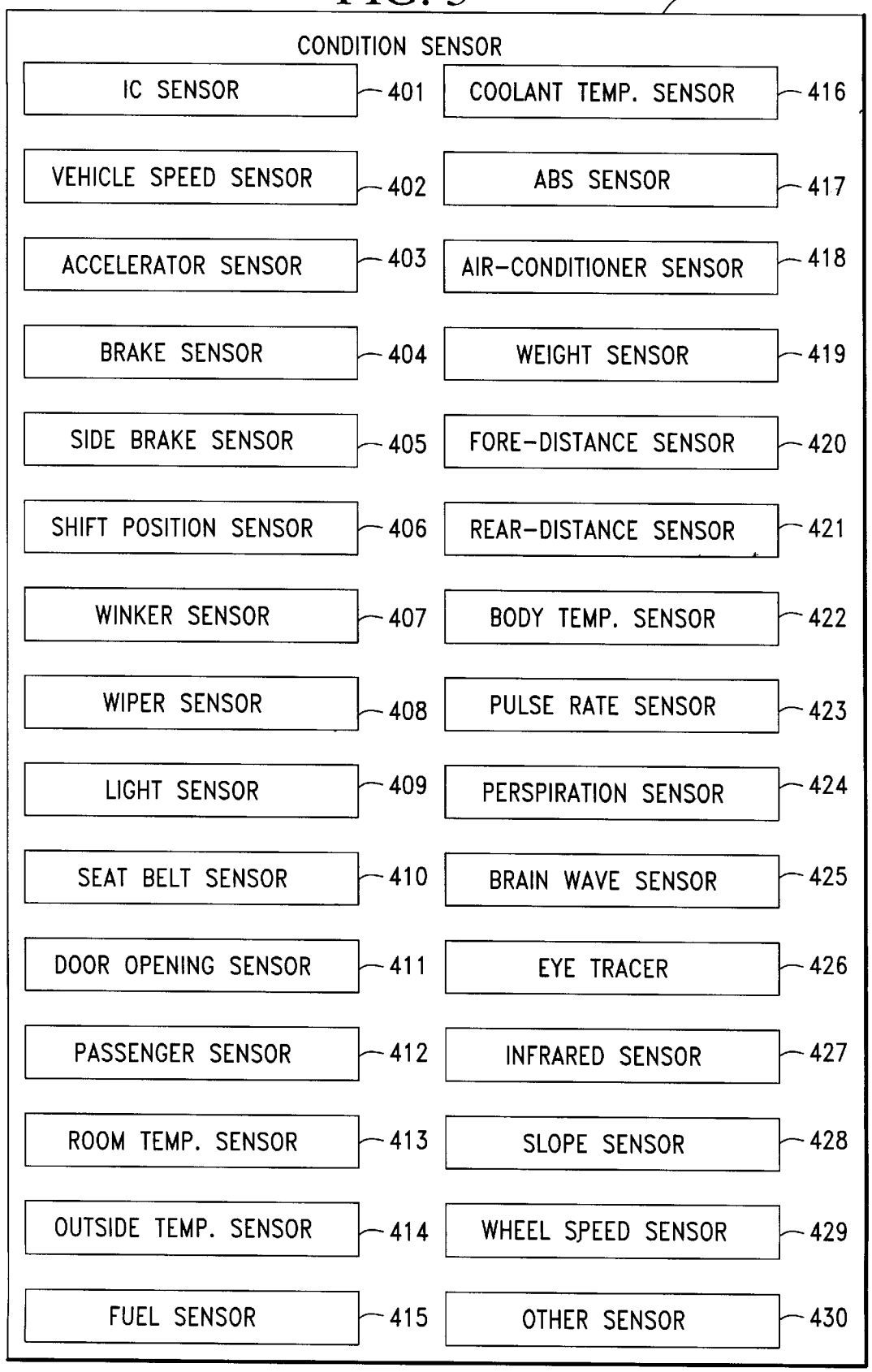
FIG. 3 shows various sensors in a current status sensor.

As shown in FIG. 3, current status sensor 40 includes an ignition sensor 401, a vehicle speed sensor 402, an accelerator sensor 403, a brake sensor 404, a side brake sensor 405, a shift position sensor 406, a blinker sensor 407, a wiper sensor 408, a light sensor 409, a seat-belt sensor 410, a door opening sensor 411, a passenger sensor 412, a room temperature sensor 413, an ambient air temperature sensor 414, a fuel remainder sensor 415, a coolant temperature sensor 416, an ABS sensor 417, an air-conditioner sensor 418, a weight sensor 419, a fore-distance sensor 420, a rear-distance sensor 421, a body temperature sensor 422, a pulse rate sensor 423, a perspiration sensor 424, a brain wave sensor 425, an eye-tracer 426, an infrared sensor 427, a slope sensor 428, a wheel speed sensor 429, and other sensors 430 for detecting, for example, decrease of air pressure of tires, loosening of belts, opening of windows, operation of horn, oil temperature, room moisture, ambient air moisture, oil temperature, oil pressure, steering angle, etc. As noted above, current status sensor 40 is used to detect various conditions in and around the vehicle and drivers conditions. Sensors are mounted at suitable locations inside or outside of the vehicle, respectively. Usually one sensor is used for one sensing purpose. However, it may be possible that some sensor receives the detection signal from another sensor to carry out indirect sensing. For example, an air-pressure sensor may indirectly detect lowering of an air-pressure of a tire in response to change of a detection signal from wheel speed sensor 429.

Ignition sensor 401 detects ON and OFF of an ignition starter switch. Vehicle speed sensor 402 may be of any conventional type including one wherein a rotation angle velocity or rotational speed of a speed meter cable is detected to calculate a vehicle speed. Accelerator sensor 403 detects a degree of push stroke of an accelerator pedal. A brake sensor 404 detects a push stroke, push force or push speed of a brake pedal to determine if the driver has braked in a panic. Side brake sensor 405 detects operation or non-operation of a side brake. Shift position sensor 406 detects the current position of a transmission shift lever. Blinker sensor 407 detects which blinker is operated. Wiper sensor 408 detects wiper drive conditions, especially wiper speed. Light sensor 409 detects various lights and lamps such as head lights, tail lamps, fog lamps, room lamps, etc., being on. Seat-belt sensor 410 detects fastening of seat-belts with respect to the drivers and passengers seats. If at least one seat-belt is not fastened, the corresponding communication program is selected and executed such that the agent appears on display 27 to give warning, notice, advice, etc., which is selected by the results of study.

Door opening sensor 411 detects opening of vehicle doors. When detecting the door is not completely closed, the driver or passenger is informed by the agent's activities (action and/or voice). Door opening sensor 411 may comprise plural sensors each detecting opening of doors beside the drivers seat, the assistant drivers seat opposite rear seats, etc., respectively. Passenger sensor 412 detects if there are any passengers in the vehicle, by the photo showing the interior of the vehicle taken by camera 28 or by a pressure sensor or weight sensor mounted under the seat. Interior temperature sensor 413 detects temperature of the passenger compartment of the vehicle, and ambient air temperature sensor 414 detects an ambient air temperature.

Fuel remainder sensor 415 detects the remainder in the fuel tank. In a specific application, the relevant communication program is selected when the fuel remainder is decreased to the average of the last five records, so that the agent urges the driver to refill the fuel.

Coolant temperature sensor 416 detects a coolant temperature. When it detects that the coolant temperature is lower than a predetermined lower level at the time immediately after the ignition switch is turned on, the agent usually acts sleepy. On the other hand, when the coolant temperature is higher than a predetermined upper level, a communication program is selected wherein the agent looks weary and gives warning or notice to the driver to prevent overheating of the engine. ABS sensor 417 detects if an ABS (anti-braking system) is in operation. As well known, ABS prevents the tires from being locked upon panic braking to thereby improve drivability and stability of the vehicle.

Air-conditioner sensor 418 detects the conditions of an air-conditioner mounted in the vehicle, including ON and OFF, the set temperature and the set air volume, etc. Weight sensor 419 detects the drivers weight, which is used solely or in combination with the photos by camera 28 to specify the driver so that the agent's activities can be determined in accordance with study item data 292 and response data 293 inherent to that specific driver. When there are different agents selectable for plural drivers, one specific agent is determined by identification of the current driver.

Fore-distance sensor 420 detects a distance to another vehicle or obstacles ahead of the vehicle current position on the road, whereas rear-distance sensor 421 detects a distance to another vehicle or obstacles astern of the vehicle current position on the road.

Body temperature sensor 422, pulse rate sensor 423 and perspiration sensor 424 detects a body temperature, a pulse rate and perspiration of the driver, respectively. These sensors may be mounted on the surface of a steering wheel to detect conditions of the drivers hand. Body temperature sensor 422 may be a plurality of thermography utilizing infrared sensor elements to detect the drivers body temperature distribution. Brain wave sensor 425 detects alpha wave or beta wave of the driver to determine the degree of alertness of the driver. Eye-tracer traces eye movement of the driver to determine the drivers intention and alertness. Infrared sensor 427 detects movement of the users hands and head.

Slope sensor 428 detects road slope, which may includes a sensor detecting the vehicle orientation in the direction of movement and another sensor detecting the vehicle orientation in a direction perpendicular to the vehicle movement. The former sensor detects if the vehicle is running uphill, downhill or on a level road, whereas the latter sensor detects the bank angle of the road. A wheel speed sensor 429 is mounted to each wheel of the vehicle for separately detecting the wheel rotational speed. A typical example of a wheel speed sensor comprises a toothed rotor rotating with the wheel and an electromagnetic pick-up mounted at a fixed position in opposition to the rotor. The pick-up counts the number of teeth of the rotor, from which the wheel speed is calculated. Wheel speed sensor 429 may be of another type including a reluctance element pick-up. The vehicle speed may be calculated from the detection signal of wheel speed sensor 429, in which case sensor 429 functions as vehicle speed sensor 402 as well.

Figure 4:
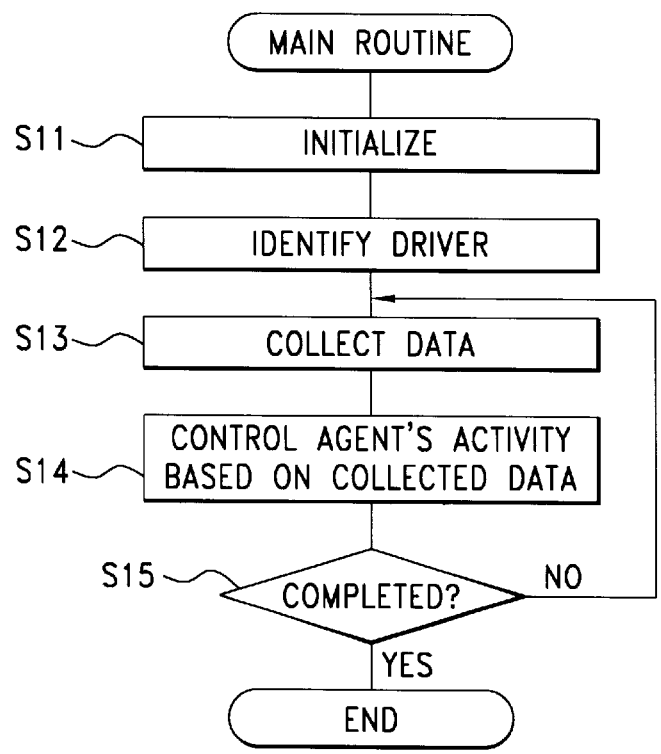
FIG. 4 is a flowchart of a main routine of the agent control operation executed in this embodiment.

FIG. 4 is a flowchart showing a main routine of the agent control operation in accordance with this embodiment. Agent processing unit 11 first initializes the system after ignition sensor 401 detects that the ignition switch is turned on, at step S11. Initialization includes erasure of existing data in RAM, allocation of the respective working areas in RAM, loading of program select table 291 into RAM, set of flags to zero. etc. Although the operation starts with turning ON of the ignition switch in this embodiment, it may start in response to detection of opening or closing of any door by door opening sensor 411.

Agent processing unit 11 then identifies the current driver, at step S12. More particularly, when the drivers voice is inputted through microphone 26, this is analyzed by voice analyzer 142 to identify who is the current driver. The current driver may also be identified by the face photograph taken by camera 28 and then analyzed by image processing unit 19. The weight detected by weight sensor 419, the drivers seat position, the angle of the room mirror may also be taken into consideration to identify the current driver. In a preferred application of S12, a driver-identifying communication program (not shown) is read out from RAM so that the agent appears on display 27 and speaks through speaker 25 for confirming that the current driver is as identified.

Once the current driver is identified and confirmed, agent processing unit 11 obtains and confirms the current status, at step S13. More specifically, agent processing unit 11 receives the current status items of data, stores them in their predetermined areas in RAM and analyzes them to confirm the current vehicle and users status. The current status items of data include data detected by the various sensors in current status sensor 40 and supplied therefrom to agent processing unit 11 through current status data processing section 15. The image data obtained by camera 28 is processed by image data processing section 13, which is also input to agent processing unit 11 as a type of the current status data. The current vehicle position data detected by current vehicle position sensor 21 is also input to agent processing unit 11 through navigation processing unit 10. By way of example of the current status data, where coolant temperature sensor 416 detects a coolant temperature t1, agent processing unit 11 stores this temperature t1 in a predetermined area in RAM and, if the temperature t1 is below a predetermined temperature t2, determines that the coolant temperature is low.

When the driver inputs any request through microphone 26, this is processed by agent processing unit 11 as a type of the current status data. Such drivers request may be input by saying "Phone to Mr Thingummy", "Show me restaurants around here", "Play a CD", etc. The drivers request is processed by voice analyzer 142 in voice processing unit 14 with keywords such as "phone" "restaurant", "play" and "CD" These keywords are applied to program select table 291 to select a specific one of the communication programs stored therein.

Agent processing unit 11 then checks study data (study item data 292 and response data 293) in agent data memory 29 to confirm the agent's study regarding the obtained current status data, at step S13.

Then, at step S14, agent processing unit 11 performs the agent control operation depending on the current status confirmed at S13. As a result of the operation at S14, the agent makes some judgement, communication (action and speaking), control, study, inspection, etc. It may be possible that the agent does nothing when so controlled by the current status.

Then, agent processing unit 11 determines if the main control routine should be terminated, at step S15. If the main control routine should continue, the procedure is returned to S13 to repeat the operations through S13–S15. On the contrary, when ignition sensor 401 detects that the ignition switch is turned off (at S13), this means that the main control routine should be terminated (No at S15). In this case, after a predetermined terminative operation such as turning-off of room interior lamps is S14, the main control routine of FIG. 4 is terminated.

In this embodiment the agent control operation at S14 includes confirmation of the vehicle condition by the agent's inquiry and the users response. This will be described in more detail in reference to the flowcharts of FIGS. 5 and 6. By this control operation, some condition in or around the vehicle ("vehicle condition"), which could not be decided by sensor detection, may be confirmed in the affirmative or negative by communication between the agent and the driver.

Figure 5:
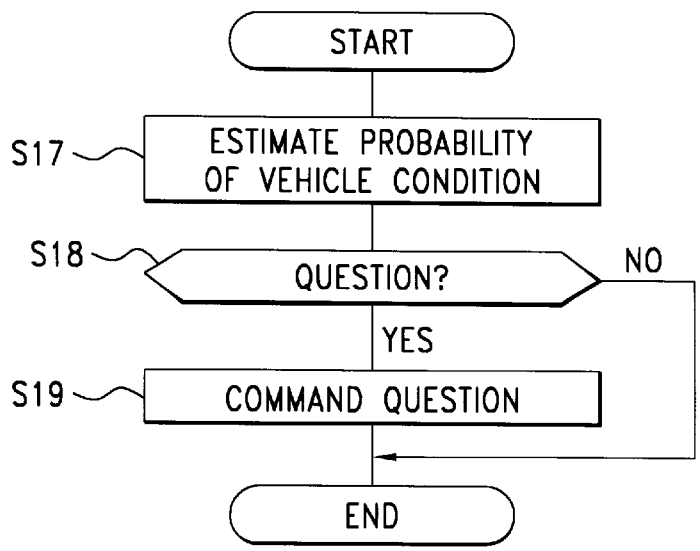
FIG. 5 is a flowchart of the operation of step S14 of the flowchart of FIG. 4.

At step S17 of the flowchart of FIG. 5, agent processing unit 11 estimates probability or likelihood of a vehicle condition based on the current status data which has been obtained at S13 of the flowchart of FIG. 4. For example, it is inferred if the vehicle has been diverted from the prescribed drive route, if the vehicle is running uphill or downhill or on a snowy road, if the road is congested, if the vehicle is running on a rampway to the highway, overpass, underpass or any other specific kind of road, etc.

Figure 6:
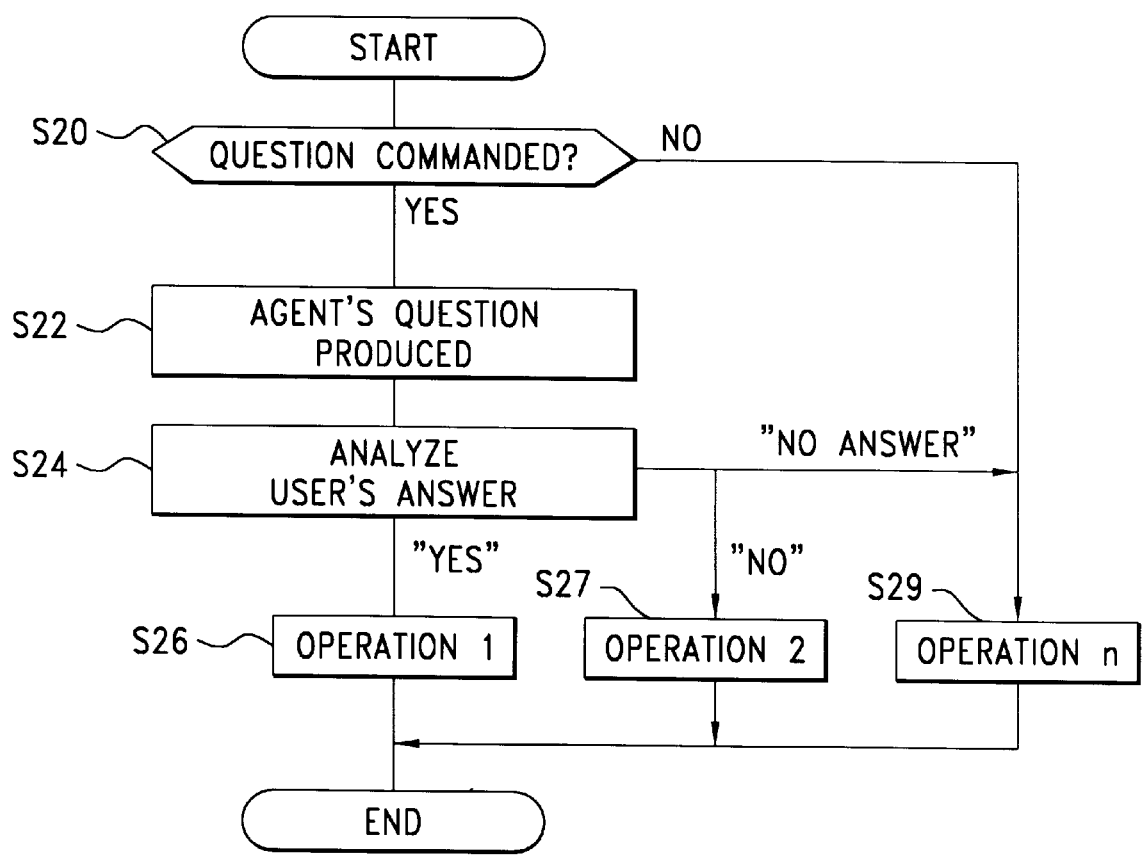
FIG. 6 is a flowchart of operations which follow the operation of FIG. 5.

According to the result of estimation at S17, agent processing unit 11 determines if it is necessary to ask to the user for confirmation of the vehicle condition by the agent's question at S18. When some vehicle condition is estimated to be likely to exist in or around the vehicle (Yes at S18), agent processing unit 11 commands the agent's question control routine at S19, as shown by the flowchart of FIG. 6.

The agent's question control routine starts with S20 which confirms the command at S19. Then, agent processing unit 11 controls the agent's activities so that the agent appears on display 27 and puts a question through speaker 25, at S22. More specifically, in accordance with the question data 296 read out in response to the specific vehicle condition estimated at S17, a proper question is made by synthesizer 141 and outputted through speaker 25. At the same time, agent processing unit 11 controls image processing unit 13 so that the agent appears on display 27 with expression and action which cooperate with the question for better communication with the user.

Then, agent processing unit 11 awaits the users answer to the agent's question at S24. The users answer is inputted through microphone 26 and analyzed by voice analyzer 142. When the answer is recognized to be an affirmative answer such as "Yes", agent processing unit 11 determines that the estimated vehicle condition is truly existing and makes a corresponding control operation at S26. When, on the other hand, the answer is recognized to be a negative answer such as "No", it makes a final decision such that there is no estimated vehicle condition and makes a corresponding control operation (or does nothing) at S27. When no answer is inputted by the user, or when the user's answer is not recognizable as being affirmative or negative, and when no question command has been generated, agent processing unit 11 makes a corresponding control operation (or does nothing) at S29.

All agent activities other than the vehicle condition confirming operation are controlled at S29. For example, the agent says "Good morning!" when the driver turns on the ignition starter switch in the morning. When sensor 415 detects remaining fuel to be below a predetermined level, the agent urges fill-up by saying "I'm hungry. Refuel, please". When hearing the driver mutter "Little bit tired" through microphone 26, the agent suggests that the driver take a short rest at a tearoom, for example, a short distance ahead.

In accordance with the above-described vehicle condition recognizing operation by agent processing unit 11, the agent's question regarding the specific vehicle condition, the user's answer thereto and the recognition and analysis of the user's answer cooperate with each other to act as a kind of sensor means. The ordinary sensor detects a specific physical quantity of an object and outputs a signal representing the detected quantity. In this embodiment, the object is a specific vehicle condition to be confirmed, and the users answer to the agent's question is inputted through microphone 26 and analyzed by voice analyzer 142.

Figure 7:
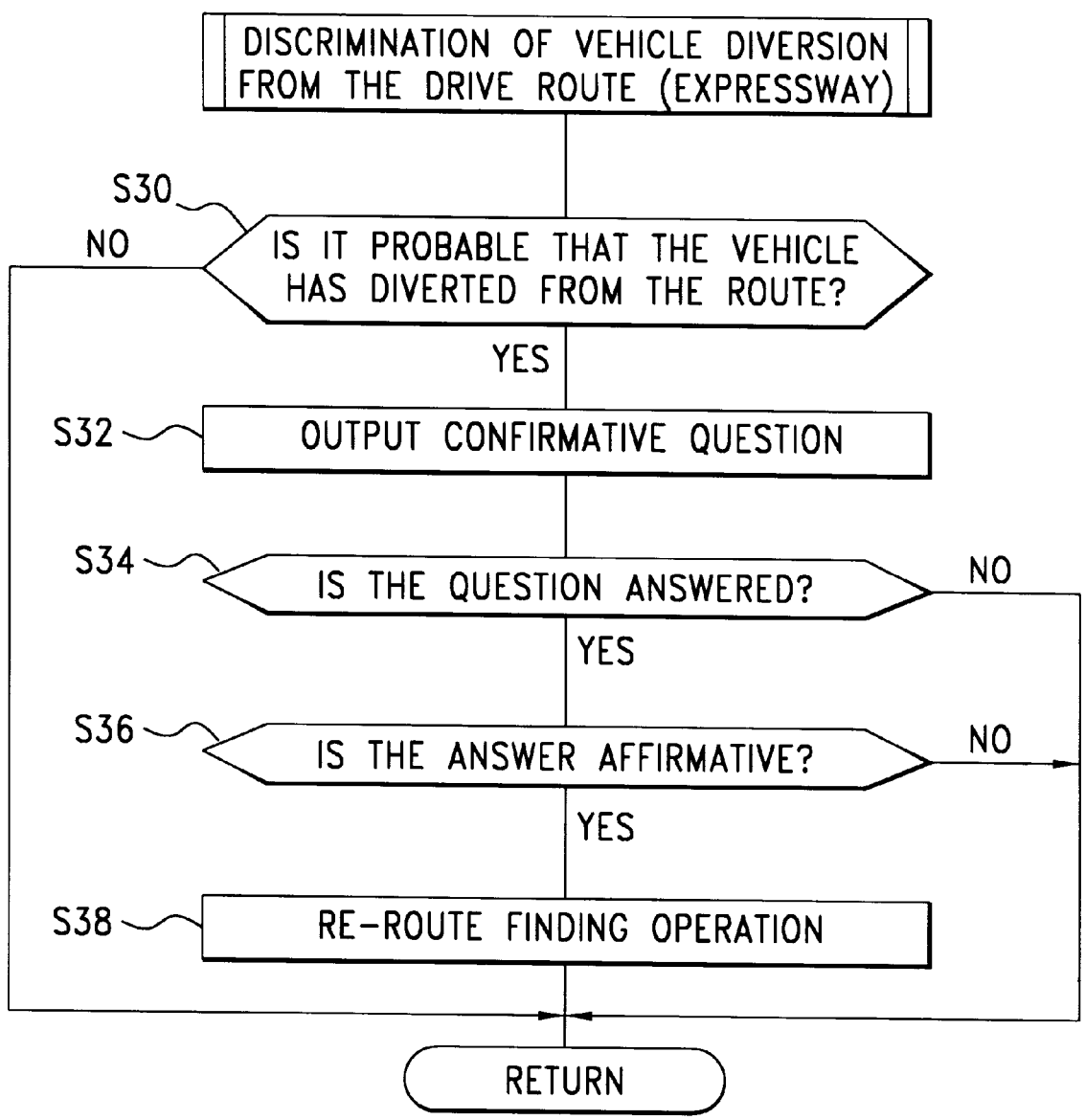
FIG. 7 is a flowchart illustrating the agent control routine where agent the processing unit infers a probability of diversion of the vehicle from a prescribed drive route that is an expressway.
Figure 8:
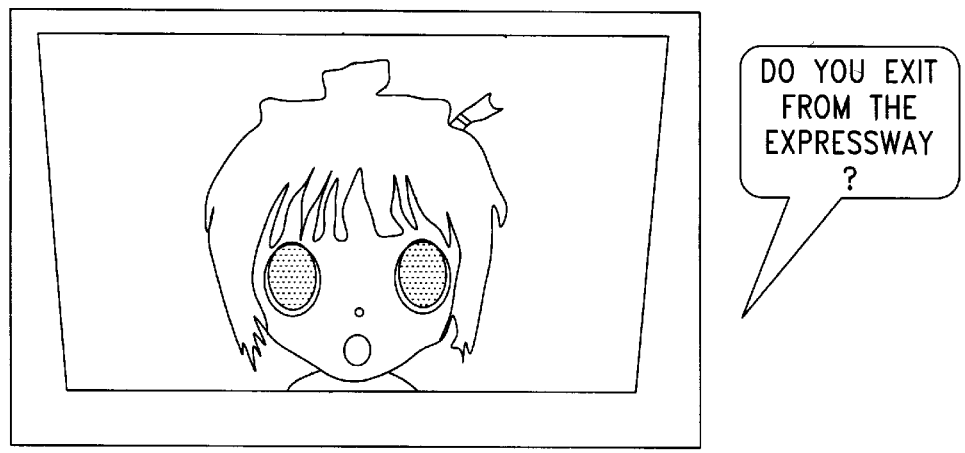

The agent control operation at S14 of the main routine of FIG. 4 will be hereinbelow described by way of specific examples. FIG. 7 is the flowchart illustrating the agent control operation where agent processing unit 11 infers a probability of diversion of the vehicle from a prescribed drive route that is an expressway. Agent processing unit 11 receives data at S13 to determine if the vehicle has been diverted from the expressway along which travel has been recommended by the navigation control operation. For example, when the vehicle current position detected by current position sensor 21, which is first confirmed by navigation processing unit 10 and then supplied to agent processing unit 11, is found to be in the vicinity of an expressway exit, and when the vehicle is found to be decelerating which is detected by vehicle speed sensor 402, agent processing unit 11 infers a probability of diversion of the vehicle.

When so determined (Yes at S30), agent control unit 11 reads out question data (or words) 296 from memory 29 and combines them together to create a suitable question such as "Do you exit from the expressway?" by synthesizer 141, which is output as the agent's question through speaker 25, at S32. Agent processing unit 11 also control appearance and activity of the agent in display 27, as shown only by way of example in FIG. 8.

Agent processing unit 11 awaits an answer by the user in response to the agent's question at S34. When some answer is input by the user through microphone 26 or input device 22 (Yes at S34), it determines if the users answer is affirmative or negative at S36. If the answer includes "Yes" or other affirmative word (Yes at S36), agent processing unit 11 makes a final decision that the vehicle is running on the expressway exit which means that it has already diverted from the prescribed drive route, and asks navigation processing unit 10 to manage a new route finding operation at S38. In the new route finding operation, navigation processing unit 10 operates to find a drive route from the current position at the exit of the expressway to the already-inputted destination. The process is then returned to the main routine of FIG. 4. When no answer is received (No at S34) or when the users answer can not be deemed as affirmative (No at S36), the process is returned to the main routine. If some different agent control operation is to be done, it is controlled at S29 of the flowchart of FIG. 6.

Figure 9:
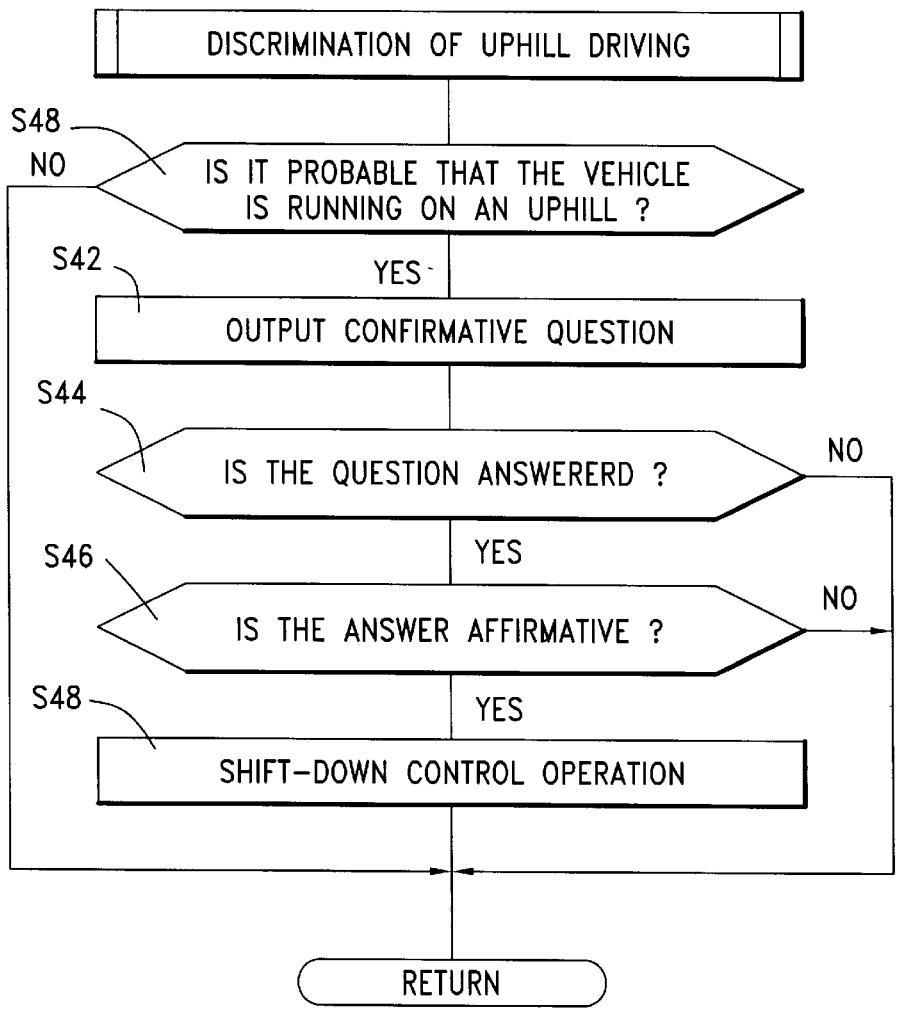
FIG. 9 is a flowchart illustrating the agent control routine where the agent processing unit infers a probability that the vehicle is now running uphill.

FIG. 9 is the flowchart illustrating the agent control operation where agent processing unit 11 infers a probability that the vehicle is now running uphill. At S40, agent processing unit 11 infers such a probability in response to data collected at S13. This can be inferred in response to detection by slope sensor 428 which detects that the road ahead has upward slope of more than a predetermined critical angle.

When it is preliminarily determined that the vehicle is running uphill (Yes at S40), agent control unit 11 reads out question data (or words) 296 from memory 29 and combines them together to create a suitable question such as "Are you running uphill?" by synthesizer 141, which is outputted as the agent's question through speaker 25, at S42. Agent processing unit 11 also controls appearance and activity of the agent in display 27.

Agent processing unit 11 awaits an answer by the user in response to the agent's question at S44. When some answer is inputted by the user through microphone 26 or input device 22 (Yes at S44), it determines if the users answer is affirmative or negative at S46. If the answer includes "Yes" or other affirmative word (Yes at S46), agent processing unit 11 makes a final decision that the vehicle is running uphill, and makes an automatic transmission down-shift control operation. More specifically, it sends a down-shift control signal to the automatic transmission control unit which automatically executes a down-shift from the current shift position at S48, which will assist smooth driving uphill. The process is then returned to the main routine of FIG. 4.

Figure 10:
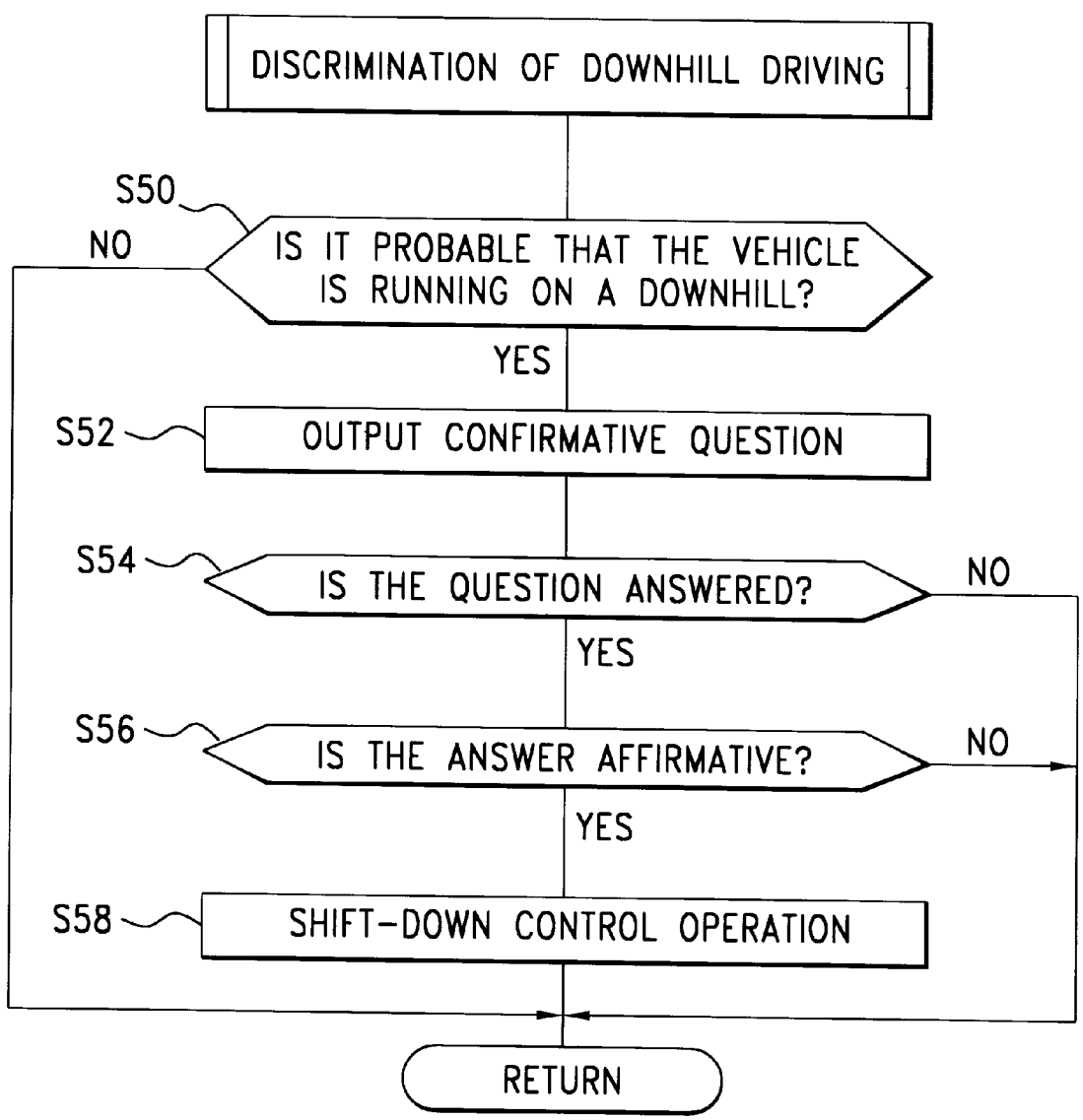
FIG. 10 is a flowchart illustrating the agent control routine where the agent processing unit infers a probability that the vehicle is now running downhill.

FIG. 10 is the flowchart illustrating the agent control operation where agent processing unit 11 infers a probability that the vehicle is now running downhill. At S50, agent processing unit 11 infers such a probability in response to data collected at S13. This can be inferred in response to detection by slope sensor 428 which detects that the road ahead has a downward slope of more than a predetermined critical angle. When it is preliminarily determined that the vehicle is running downhill (Yes at S50), agent control unit 11 reads out question data (or words) 296 from memory 29 and combines them together to create a suitable question such as "Are you running on a downhill?" by synthesizer 141, which is output as the agent's question through speaker 25, at S52. Agent processing unit 11 also controls appearance and activity of the agent in display 27.

Agent processing unit 11 awaits an answer by the user in response to the agent's question at S54. When some answer is inputted by the user through microphone 26 or input device 22 (Yes at S54), it determines if the users answer is affirmative or negative at S56. If the answer includes "Yes" or other affirmative word (Yes at S56), agent processing unit 11 makes a final decision that the vehicle is running downhill, and makes an automatic transmission down-shift control operation. More specifically, it sends a down-shift control signal to an A/T ECU (automatic transmission control unit, not shown) which automatically executes down-shift from the current shift position at S58, which will increase engine brake power for safe driving downhill. The process is then returned to the main routine of FIG. 4.

Figure 11:
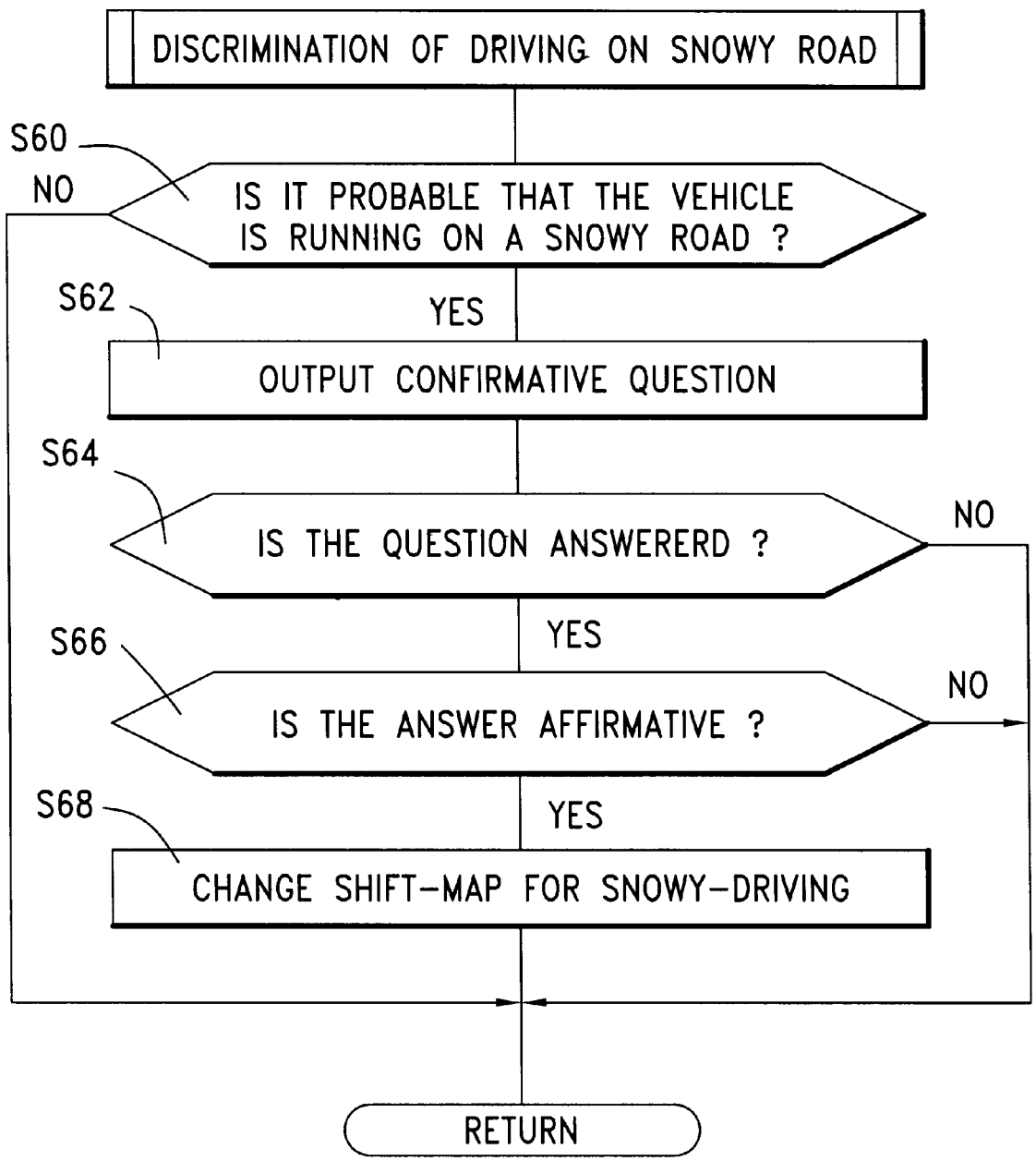
FIG. 11 is a flowchart illustrating the agent control routine where the agent processing unit infers a probability that the vehicle is now running on a snowy road.

FIG. 11 is the flowchart illustrating the agent control operation where agent processing unit 11 infers a probability that the vehicle is now running on a snowy road. At S60, agent processing unit 11 infers such a probability in response to data collected at S13. This can be inferred in response to detection by wheel speed sensor 429 of a wheel speed difference between front-wheels and rear-wheels which indicates a wheel slippage. This can also be inferred by an atmospheric or road temperature detected by thermometer 414. When it is preliminarily determined that the vehicle is running on a snowy road (Yes at S60), agent control unit 11 reads out question data (or words) 296 from memory 29 and combines them with each other to create a suitable question such as "Are you running on a snowy road?" by synthesizer 141, which is output as the agent's question through speaker 25, at S62. Agent processing unit 11 also controls appearance and activity of the agent in display 27.

Agent processing unit 11 awaits an answer by the user in response to the agents question at S64. When some answer is input by the user through microphone 26 or input device 22 (Yes at S64), it determines if the users answer is affirmative or negative at S66. If the answer includes "Yes" or other affirmative word (Yes at S66), agent processing unit 11 makes a final decision that the vehicle is now running on a snowy road, and commands a shift-map change to the automatic transmission control unit. More specifically, the A/T ECU changes a shift-map from the current one for normal driving to another one for driving on a snowy road at S68. The process is then returned to the main routine of FIG. 4. After that, the A/T ECU controls the automatic transmission in accordance with the selected shift map for use in driving on a snowy road.

Figure 12:
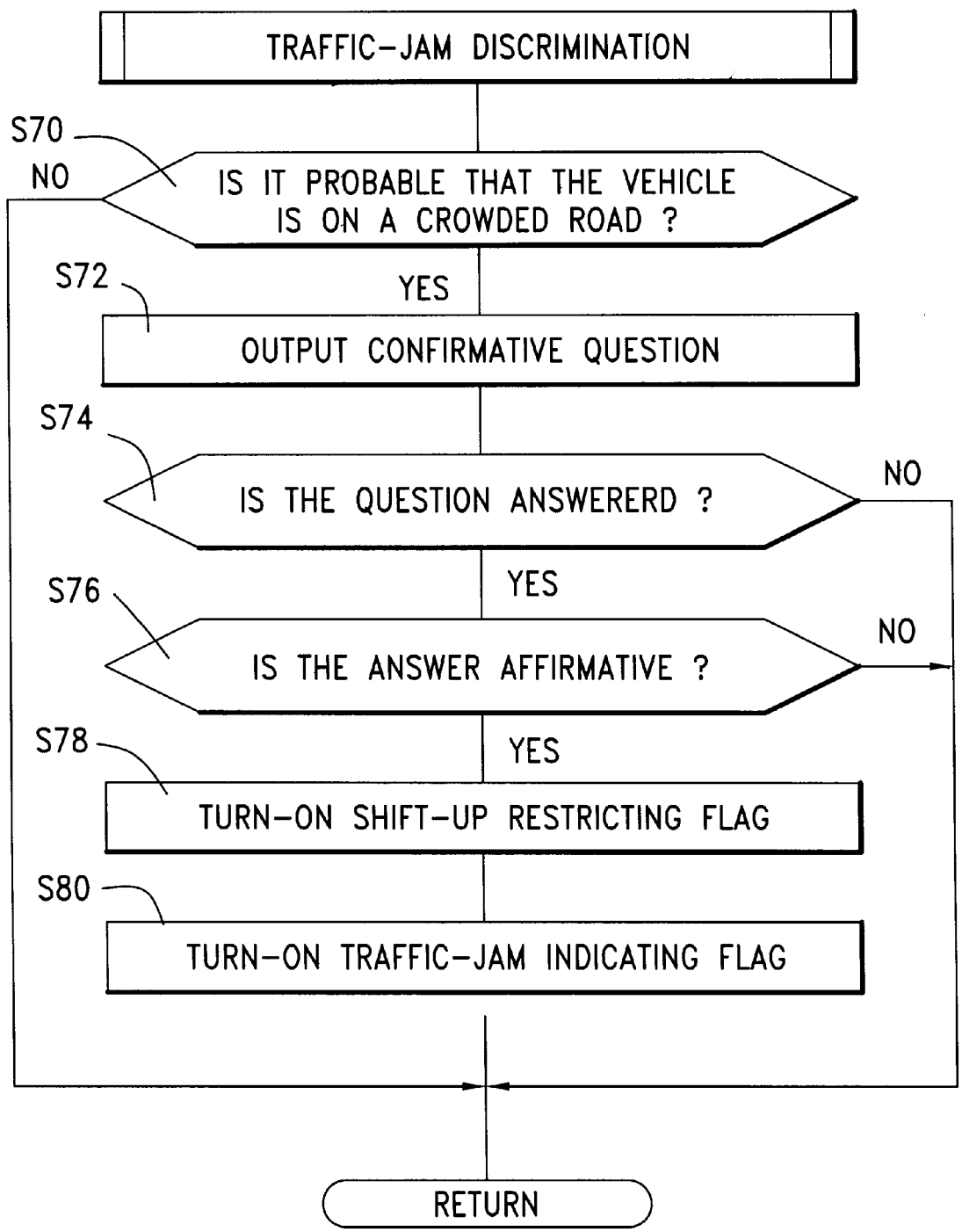
FIG. 12 is a flowchart illustrating the agent control routine where the agent processing unit infers a probability that the vehicle is now running on a congested road.

FIG. 12 is the flowchart illustrating the agent control operation where agent processing unit 11 infers a probability that the vehicle is now running on a congested road. At S70, agent processing unit 11 infers such a probability in response to data collected at S13. This can be inferred when receiving a traffic jam indicating signal from a control center of VICS (vehicle information and communication system) or ATIS (advanced traffic information service) through communication control unit 24 and I/F 12. This can also be inferred when an average interval between decelerating operations (release of the accelerator pedal, actuation of the brake pedal, etc.) is decreased to below a predetermined short period of time, or when an average vehicle speed within a given time interval is decreased to below a predetermined value. When it is preliminarily determined that the vehicle is running on a congested road (Yes at S70), agent control unit 11 reads out question data (or words) 296 from memory 29 and combines them with each other to create a suitable question such as "Are you running on a congested road?" by synthesizer 141, which is outputted as the agent's question through speaker 25, at S72. Agent processing unit 11 also controls appearance and activity of the agent in display 27.

Agent processing unit 11 awaits an answer by the user in response to the agent's question at S74. When some answer is input by the user through microphone 26 or input device 22 (Yes at S74), it determines if the users answer is affirmative or negative at S76. If the answer includes "Yes" or other affirmative word (Yes at S76), agent processing unit 11 makes a final decision that the road is congested, and sets an up-shift restricting flag and a traffic jam indicating flag to be both ON at S78 and S80, followed by returning to the main routine of FIG. 4. After that, since the up-shift restricting flag has been set to ON, A/T ECU controls the automatic transmission such that an up-shift is permitted at a point higher than in usual transmission control.

Figure 13:
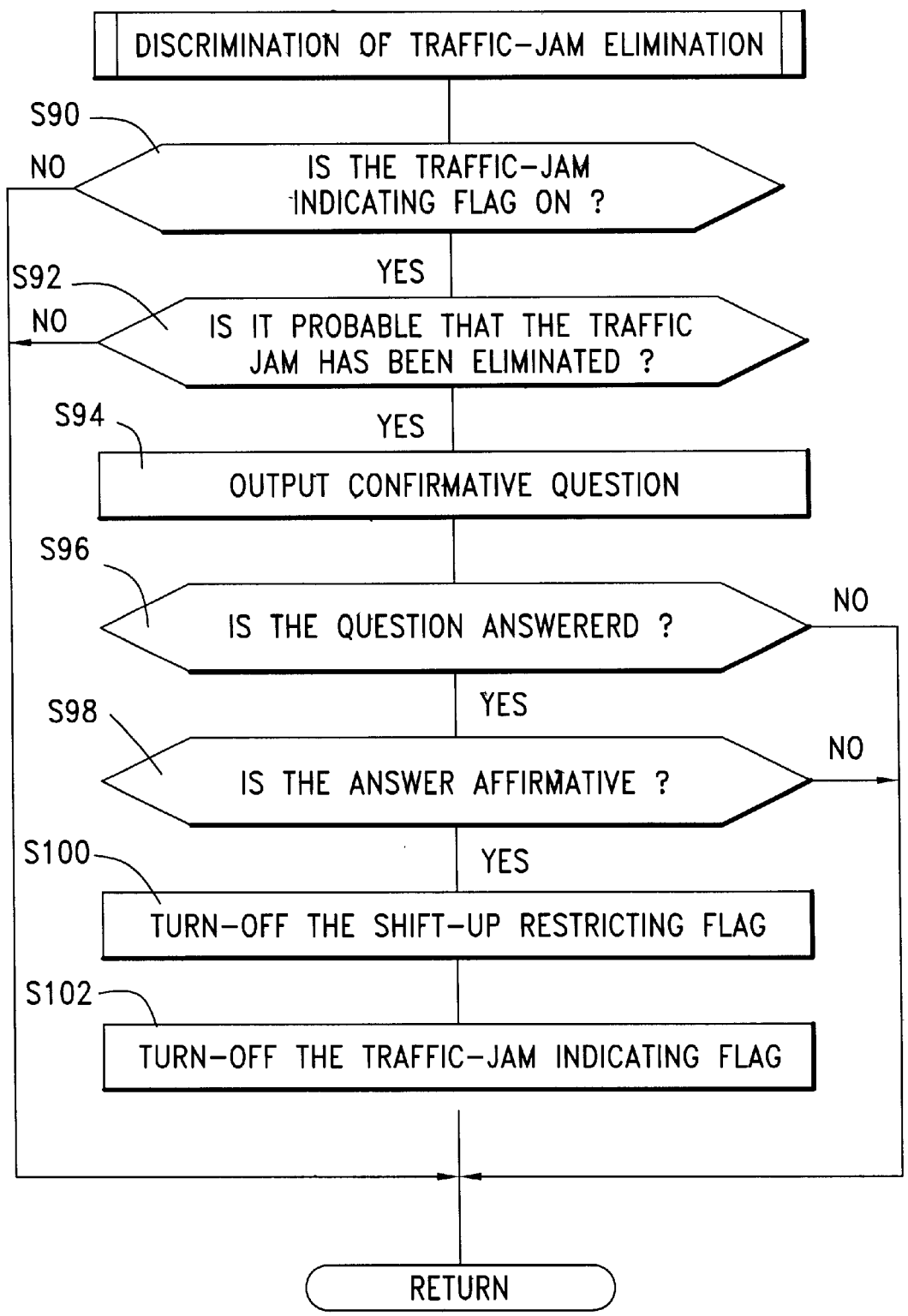
FIG. 13 is a flowchart illustrating the agent control routine where the agent processing unit infers that the traffic jam on the road has been eliminated.

FIG. 13 is the flowchart illustrating the agent control operation where agent processing unit 11 infers a probability that a traffic jam on the road, which has been inferred and confirmed, is eliminated. At S90, agent processing unit 11 determines if the traffic jam indicating flag is now ON (which could be set at S80 of the preceding flowchart of FIG. 12). When it is the case (Yes at S90), then, agent processing unit 11 infers a probability of elimination of the traffic jam at S92, in response to data collected at S13. This can be inferred when receiving a signal indicating elimination of the traffic jam from a control center of VICS (vehicle information and communication system) or ATIS (advanced traffic information service) through communication control unit 24 and I/F 12. This can also be inferred when an average interval between decelerating operations (release of the accelerator pedal, actuation of the brake pedal, etc.) is increased to above a predetermined long period of time, or when an average vehicle speed within a given time interval is increased to above a predetermined value. When it is preliminarily determined that the traffic jam on the road has been eliminated (Yes at S92), agent control unit 11 reads out question data (or words) 296 from memory 29 and combines them with each other to create a suitable question such as "Is the traffic jam over?" by synthesizer 141, which is outputted as the agent's question through speaker 25, at S94. Agent processing unit 11 also controls appearance and activity of the agent in display 27.

Agent processing unit 11 awaits an answer by the user in response to the agent's question at S96. When some answer is inputted by the user through microphone 26 or input device 22 (Yes at S96), it determines if the user's answer is affirmative or negative at S98. If the answer includes "Yes" or other affirmative word (Yes at S98), agent processing unit 11 makes a final decision that the road congestion is over, and turns off the up-shift restricting flag and the traffic-jam flag respectively at S100 and S102, followed by returning to the main routine of FIG. 4. After that, A/T ECU again controls the automatic transmission in accordance with the usual up-shift points.

Figure 14:
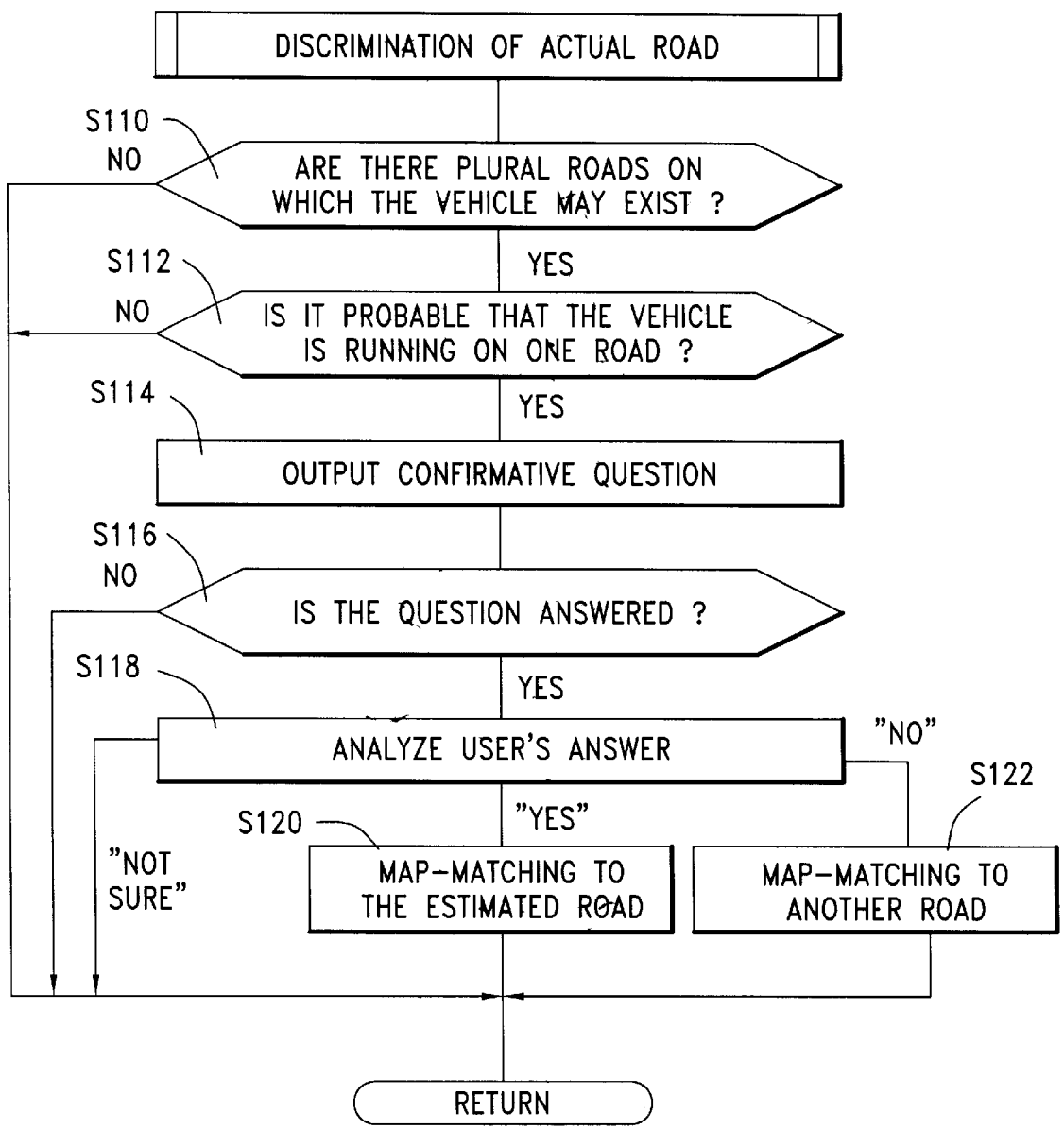
FIG. 14 is a flowchart illustrating the agent control routine where the agent processing unit infers a probability that the vehicle is now running on an expressway.

FIG. 14 is the flowchart illustrating the agent control operation where the road on which the vehicle is now running is difficult to be identified and could not be distinguished from a neighboring road extending substantially in parallel with the road currently driven. Such a situation may arise when the road is branched ahead into two or more roads which extend substantially in parallel with each other over a considerable distance after the branch point. In another example, a rampway to or from a highway road may extend therealong over a considerable distance. An elevated highway road could not be distinguished from an underpass in a planar view. Such a confusing situation may result in a map-matching error, causing the current vehicle position to be shown at an incorrect point in display 27.

At S110, agent processing unit 11 first determines if there are plural roads near the vehicle current position detected by position sensor 21. When only one road exists around the current position, the above-described confusing situation never arises and, therefore, the process is returned to the main routine of FIG. 4. When plural roads exist (Yes at S110), it then determines at S112 one of the roads on which the vehicle would currently exist, in response to data collected at S13. For example, suppose that it has been confirmed at S110 that there are two parallel extending roads, one being an expressway and another being an underpass, when the vehicle speed detected by speed sensor 402 is greater than a predetermined value, it could be inferred that the vehicle is running on the expressway. When the driver operates the brake pedal relatively frequently, it could be inferred that the vehicle is now running on the underpass. The road inclination detected by slope sensor 428 after a point of junction may be used to infer which road the vehicle is running. The detection result from the blinker sensor 407 and/or steering sensor 213 at the junction may also be used in the inference at S112.

Then, agent control unit 11 reads out question data (or words) 296 from memory 29 and combines them with each other to create a suitable question. More specifically, when it has been inferred at S112 that the vehicle is now running on the expressway, such a question as "Are you running on the expressway?" is produced by synthesizer 141 and outputted as the agent's question through speaker 25, at S114. Agent processing unit 11 also controls appearance and activity of the agent in display 27.

Agent processing unit 11 awaits an answer by the user in response to the agent's question at S116. When same answer is inputted by the user through microphone 26 or input device 22 (Yes at S116), it determines if the users answer is affirmative or negative or indeterminate at S118. When the answer includes "Yes" or other affirmative word (Yes at S118), agent processing unit 11 makes a final decision that the vehicle is truly running on the expressway, and the vehicle position is map-matched on the expressway at S 120. If the answer includes "No" or other negative word (No at S118), which denies the previous assumption made at S112, it reverses the previous assumption and now makes a final decision that the vehicle is actually running on another road (i.e., the underpass in the above example), and the vehicle position is map-matched on the underpass, at S122. After such map-matching operation at S120 or S122, the process is returned to the main routine of FIG. 4. If the answer is not determinative (such as "I'm not sure", "Uncertain", etc.) which does not include "Yes" nor "No", the process is also returned to the main routine of FIG. 4, in which case map-matching operation is suspended until the vehicle reaches a position where there is only one road within a predetermined area of the vehicle current position detected by position sensor 21.

Although the foregoing description relates to inference and decision as to some types of current vehicle-confronting conditions, it should be understood that the system will work in the same manner when inferring a specific in-vehicle condition, out-vehicle condition or road condition.

For example, when agent processing unit 11 infers that it is snowing around the vehicle (as one of the out-vehicle conditions), question data (or words) 296 are read out from memory 29 and combined with each other so that a suitable question such as "Snowing?" is produced by synthesizer 141 and outputted as the agent's question through speaker 25. The question can easily be answered by simply saying "Yes" or "No", which can easily be recognized by voice analyzer 142. Agent processing unit 11 also controls appearance and activity of the agent in display 27. When the users answer inputted through microphone 26 or input device 22 includes "Yes" or other affirmative word, agent processing unit 11 makes a final decision that it is actually snowing around the vehicle and, accordingly, executes a necessary vehicle control operation. For example, the shift map to be applied in automatic transmission control by A/T ECU is changed to one for driving on a snowy road.

In accordance with the prior art system, it has been difficult to determine such a vehicle condition (whether it is snowing or not, for example). If a wheel slippage between fore and rear wheels is detected, and even if this sensor detection is combined with another sensor detection of the atmospheric temperature, it does not always indicate a snowfall. Some prior art employs a CCD camera that takes a photograph of the road ahead of the vehicle, so that a snowfall is assumed from a whitey image. Apart from the disadvantage of increased cost, this can not yet provide a reliable decision. When the camera sees a white lane-dividing line, it could be misread as snow. When snow on the road is soiled with mud, it's photograph could not be analyzed to indicate snowfall.

In comparison with the prior art system, the system of the present invention employs a simple sensor arrangement which is used to make a first, preliminary inference with respect to a certain vehicle condition, which does not need too much reliability and accuracy. Uncertainty of first inference can be eliminated and corrected by communication between the agent and the user. Thus, the system produces a final decision with enhanced reliability and accuracy.

Although the present invention has been described in relation to a specific embodiment thereof, it should be understood by those skilled in the art that many modifications and variations may be made without departing from the scope and spirit of the invention as defined by the appended claims.

For example, when it is first determined that the vehicle is running on a specific road (A), agent processing unit 11 makes access to map data 302 in memory 30 to find a landmark building (8), so that the agent questions "Can you find the building B ahead on the road ?", rather than saying "Are you running on the road A?" as in the foregoing embodiment.

Preferably, the agent question is easily answered by a simple affirmative or negative word, "Yes" or "No", which may be easily and correctly recognized by voice analyzer 142. However, the agent question may be in a different style. For example, when it is first determined that the vehicle is running on a specific road (A), the agent may question "Can you find any landmark ahead ?". The user may answer "There is a McDonald's shop on the right ahead". Then, agent processing unit 11 makes access to map data 302 to determine the road on which the vehicle is currently running (after a point of junction). In another embodiment, the agent produces a second question when the user answers "I'm not sure" or "Uncertain" at S118 in reply to the first question at S114 of FIG. 14.

Since agent processing unit 11 is communicative with navigation processing unit 10, a part of inference and determination may be done by the latter unit. For example, the determinations at S30 of FIG. 7, and at S110 and S112 of FIG. 14 may be done by navigation processing unit 10. In this case, agent processing unit 11 receives the result of the determination by navigation processing unit 10 to execute operation of the succeeding steps.

The system of the present invention may be designed without an "agent". In this case, the agent does not appear on display 27, but a proper question is likewise output through speaker 25. Agent processing unit 11 is replaced by another control unit that works in the same manner excepting the agent's activity control appearing on display 27.

In accordance with the present invention, reliable and accurate determination of a vehicle condition may be used in various vehicle control operations. In the foregoing embodiment, with reference to the flowchart of FIG. 9, it is described that agent processing unit 11 executes the down-shift control operation in response to a final determination that the vehicle is running uphill. This is merely an example. In another example, agent processing unit 11 controls A/T ECU so that an up-shift point is elevated to a higher point than usual until the vehicle reaches the top of the hill. This control operation may be combined with the down-shift control operation. In still another embodiment, a shift-map for uphill driving has been prepared and stored in A/T ECU, which is selected when it is determined that the vehicle is running uphill.

What we claim is:

1. An interactive vehicle control system comprising:
   a sensor mounted on a vehicle for detecting a specific physical parameter that relates to the vehicle or to driving of the vehicle and for outputting a detection signal;
   discriminating means for inferring, from said detection signal, with a degree of reliability, existence of at least one specific condition to be considered in vehicle control, said physical parameter relating to said one specific condition;
   output means for outputting a question for confirmation of said specific condition when the degree of reliability determined by said discriminating means lies within a predetermined range;
   input means for inputting a user's answer to said outputted question;
   decision making means for, based on said user's answer, determining whether or not said specific condition actually exists; and
   execution means for executing a vehicle control operation in accordance with a result of the determination by said decision making means.

2. An interactive vehicle control system according to claim 1 wherein said specific condition comprises one or more selected from the group consisting of current vehicle position, current vehicle speed, current shift position of an automatic transmission, current operative condition of any device mounted on the vehicle, engine oil temperature and pressure, room temperature, atmospheric temperature, road condition and weather condition.

3. An interactive vehicle control system according to claim 1 wherein said output means comprises a speaker through which said question is outputted as a machine voice.

4. An interactive vehicle control system according to claim 1 wherein said input means comprises a microphone through which said user's answer is inputted as a user's own voice.

5. An interactive vehicle control system according to claim 4 wherein said final decision making means includes a voice analyzer that analyzes said user's voice answer to confirm said answer is affirmative or negative.

6. An interactive vehicle control system according to claim 1 which further comprises a display on which a personified agent is visually depicted for communication with the user in the vehicle, and agent control means for controlling activities of said agent, said question from said output means being a type of agent activity controlled by said agent control means.

7. An interactive automatic transmission control system comprising:

sensor means mounted on a vehicle for inferring, with a degree of reliability, that a vehicle is now running uphill or downhill at an angle of inclination greater than a predetermined angle;

output means for outputting a question for confirmation of the inference by said sensor means when the degree of reliability lies within a predetermined range;

input means for inputting a user's answer to said outputted question; and automatic transmission control means for outputting a down-shift command to an automatic transmission when it is confirmed by said user's answer that the vehicle is actually running uphill or downhill.

8. An interactive vehicle control system according to claim 7 wherein said sensor means comprises a slope sensor for detecting an orientation of the vehicle in a direction of advancement thereof.

9. An interactive vehicle control system according to claim 1 wherein said sensor means comprises a combination of an accelerator sensor for detecting a degree of opening of an accelerator and a vehicle speed sensor for detecting a current vehicle speed, result of detection of these sensors being indicative of a vehicle speed variation with respect to the degree of accelerator opening at a current shift position.

10. An interactive vehicle automatic transmission control system comprising:

sensor means mounted on a vehicle for inferring, with a degree of reliability that a vehicle is now running on a slippery road;

output means for outputting a question for confirmation of the inference of existence of the slippery road by said sensor means, when the degree of reliability is within a predetermined range;

input means for inputting a user's answer to said outputted question; and an automatic transmission control means for outputting a down-shift command to an automatic transmission when it is confirmed by said user's answer that the vehicle is actually running on the slippery road.

11. An interactive vehicle control system according to claim 10 wherein said sensor means comprises wheel speed sensors for respectively detecting speeds of driven wheels and non-driven wheels, capable of indicating wheel slippage between the driven and non-driven wheels, and/or a thermosensor for detecting an atmospheric temperature.

12. An interactive navigation system comprising:

a current position sensor for detecting current position of a vehicle;

route-finding means for determining a drive route from the current position detected by said current position sensor to a predetermined destination;

inference means, that receives during driving a detection signal from said current position sensor, for inferring from the detection signal, with a degree of reliability, that the vehicle has been diverted from the drive route determined by said route-finding means;

a speaker that outputs a machine voice question by which said inferred diversion can be confirmed, when the degree of reliability is within a predetermined range;

a microphone that inputs a user's voice answer to said question;

final decision making means for, based on said user's voice answer, determining whether or not the vehicle has actually been diverted from the drive route; and position correct means for correcting vehicle position on a map in accordance with a result of determination by said final decision making means.

13. An interactive navigation system according to claim 12 wherein said route-finding means determines another drive route from the corrected vehicle position, determined by said position correct means, to the destination when said final decision making means confirms diversion of the vehicle from the previous drive route.

14. An interactive navigation system comprising:

a current position sensor for detecting current position of a vehicle;

route-finding means for determining a drive route from the current position detected by said current position sensor to a predetermined destination;

inference means for inferring, with a degree of reliability, a traffic jam on the drive route which has been determined by said route-finding means and along which the vehicle is currently driven;

a speaker that outputs a machine voice question by which said inferred traffic jam can be confirmed, when the degree of reliability is within a predetermined range;

a microphone that inputs a user's voice answer to said question; and final decision making means for, responsive to said user's voice answer, determining whether or not there is actually a traffic jam on the current drive route;

wherein said route-finding means determines another drive route to the destination which detours the traffic jam, when said final decision making means confirms the traffic jam on the current drive route.

* * * * *